United States Patent
Yano

(10) Patent No.: US 8,012,283 B2
(45) Date of Patent: Sep. 6, 2011

(54) METHOD FOR PRODUCING FIBER-REINFORCED RESIN COMPOSITION

(75) Inventor: Koki Yano, Sodegaura (JP)

(73) Assignee: Prime Polymer Co., Ltd., Tokyo (JP)

(*) Notice: Subject to any disclaimer, the term of this patent is extended or adjusted under 35 U.S.C. 154(b) by 648 days.

(21) Appl. No.: 11/574,769

(22) PCT Filed: Sep. 6, 2005

(86) PCT No.: PCT/JP2005/016332
§ 371 (c)(1),
(2), (4) Date: Mar. 6, 2007

(87) PCT Pub. No.: WO2006/028091
PCT Pub. Date: Mar. 16, 2006

(65) Prior Publication Data
US 2007/0227646 A1 Oct. 4, 2007

(30) Foreign Application Priority Data
Sep. 6, 2004 (JP) ................. 2004-257971

(51) Int. Cl.
*B05D 1/18* (2006.01)
*B05C 3/12* (2006.01)

(52) U.S. Cl. .......... 156/180; 264/136; 427/434.7; 118/405; 118/420

(58) Field of Classification Search .......... 156/166, 156/180, 441; 264/136, 137; 425/114; 118/405, 118/420; 427/355, 359, 434.4, 434.6, 434.7
See application file for complete search history.

(56) References Cited

U.S. PATENT DOCUMENTS

| | | | |
|---|---|---|---|
| 3,605,818 A | * | 9/1971 | Balchan ............. 138/126 |
| 4,565,153 A | * | 1/1986 | Corley ............... 118/405 |
| 5,277,566 A | * | 1/1994 | Augustin et al. ......... 425/114 |
| 5,783,129 A | * | 7/1998 | Shirai et al. .......... 264/136 |

FOREIGN PATENT DOCUMENTS

| | | |
|---|---|---|
| JP | 3-19810 | 1/1991 |
| JP | 5-293825 | 11/1993 |
| JP | 7 52226 | 2/1995 |
| JP | 7 62246 | 3/1995 |
| JP | 7 251437 | 10/1995 |
| JP | 10-264152 | * 10/1998 |
| JP | 10-315341 | 12/1998 |
| JP | 2002 307432 | 10/2002 |
| JP | 2003-49002 | 2/2003 |
| JP | 2003-305779 | 10/2003 |

OTHER PUBLICATIONS

Office Action issued Dec. 7, 2010, in Japan Patent Application No. 2004-257971 (with partial English-language Translation).

* cited by examiner

*Primary Examiner* — Michael A Tolin
(74) *Attorney, Agent, or Firm* — Oblon, Spivak, McClelland, Maier & Neustadt, L.L.P.

(57) ABSTRACT

A method for producing a fiber-reinforced resin composition including supplying a plurality of fiber bundles (1) into an impregnation chamber (10); supplying a molten thermoplastic resin from a resin flow inlet (4) into the impregnation chamber (10) so that the amount of the resin flow is almost the same on on each side the direction perpendicular to the fiber bundle (1) progress direction; contacting the molten thermoplastic resin with the fiber bundles (1) to impregnate the fiber bundles (1) with the molten thermoplastic resin; and withdrawing the fiber bundles (1) impregnated with the molten thermoplastic resin from the impregnation chamber (10).

13 Claims, 16 Drawing Sheets

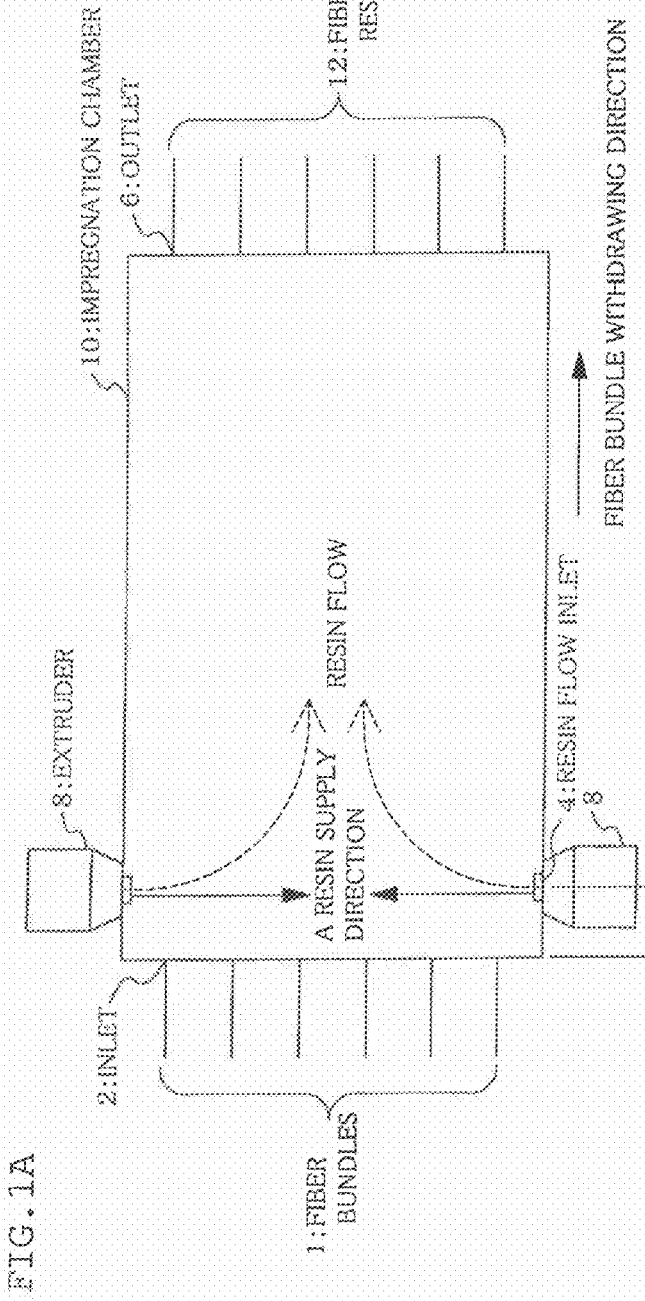
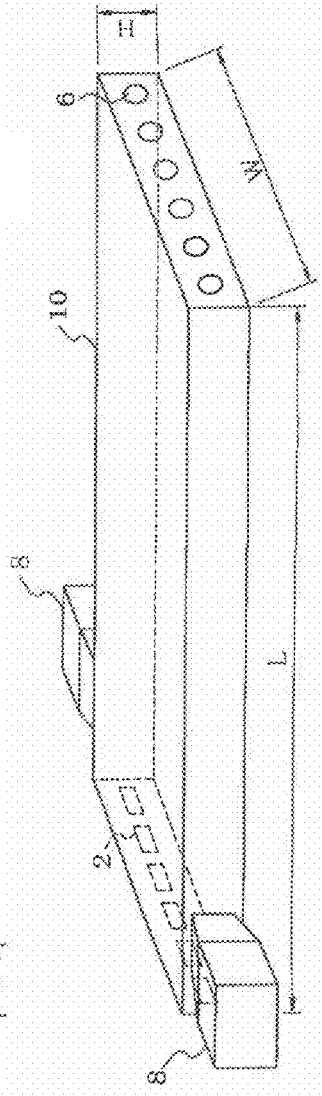
FIG. 1A
FIG. 1B

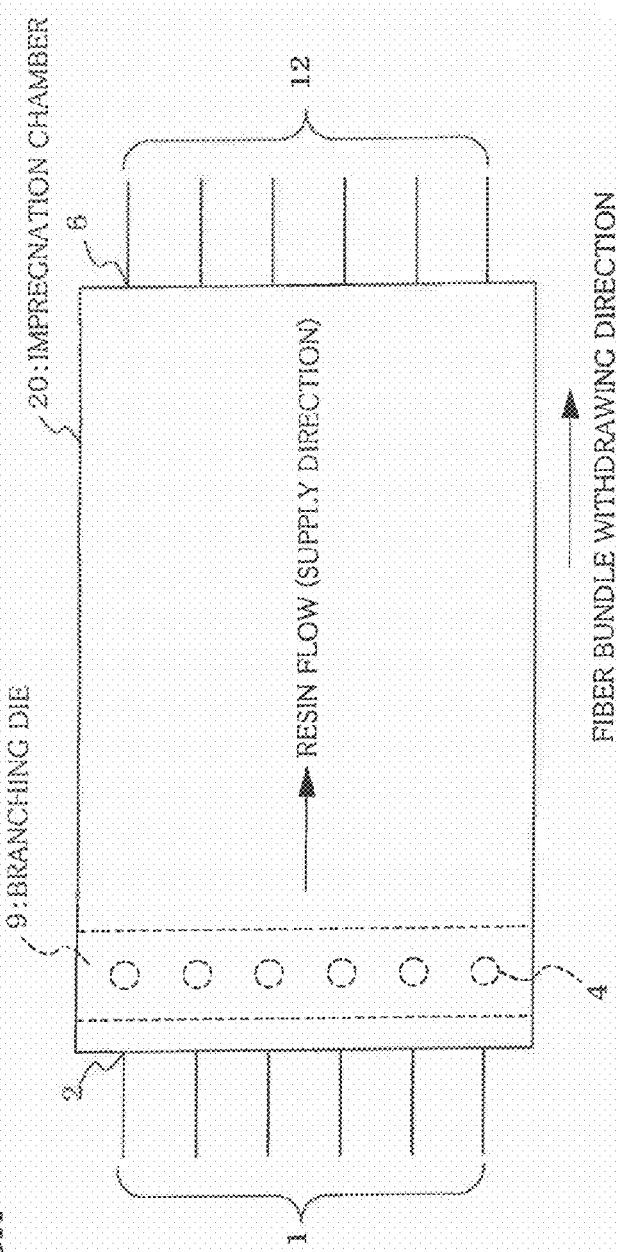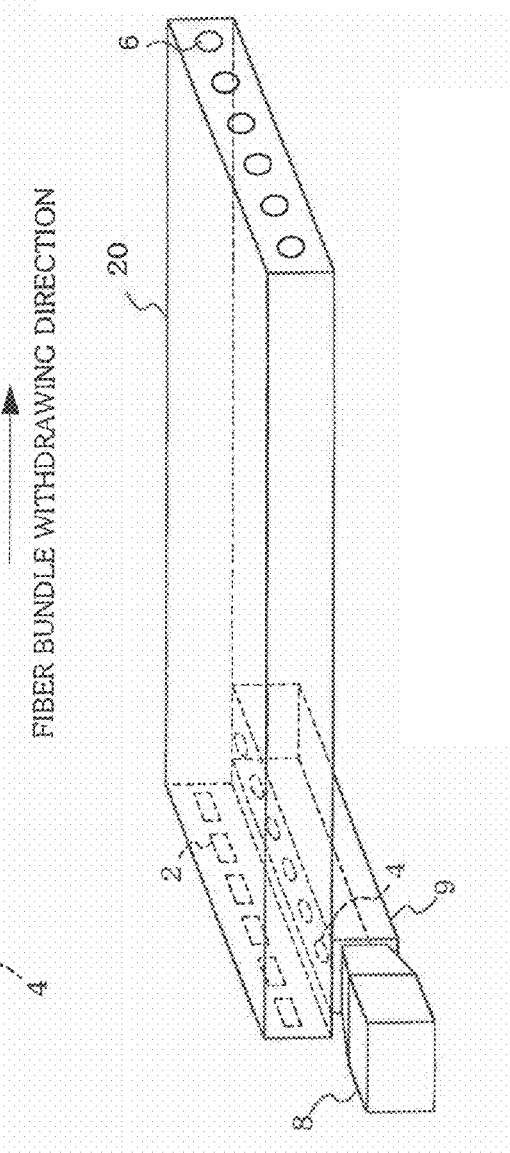
FIG. 5A
FIG. 5B

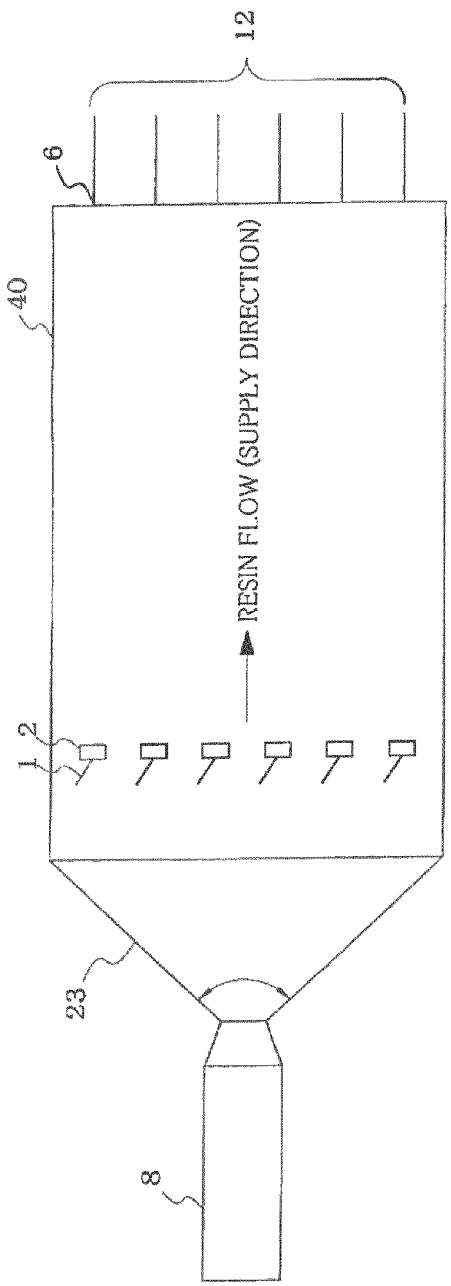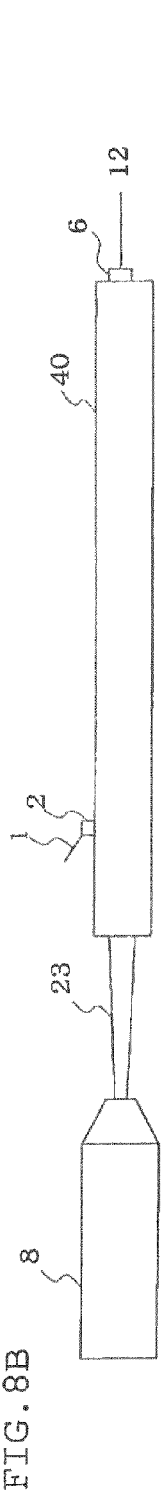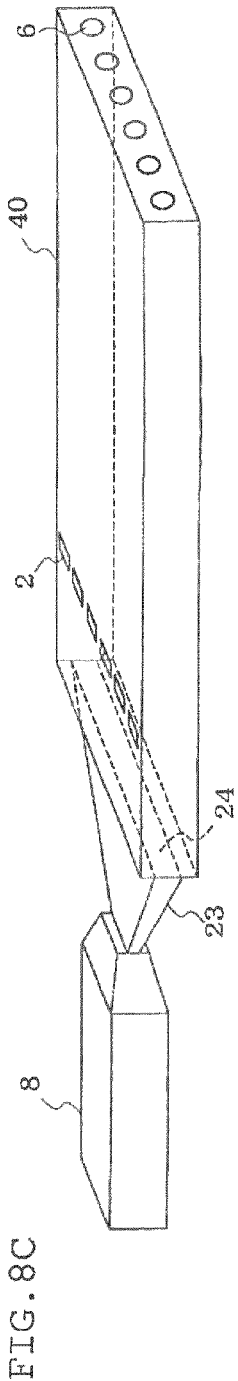

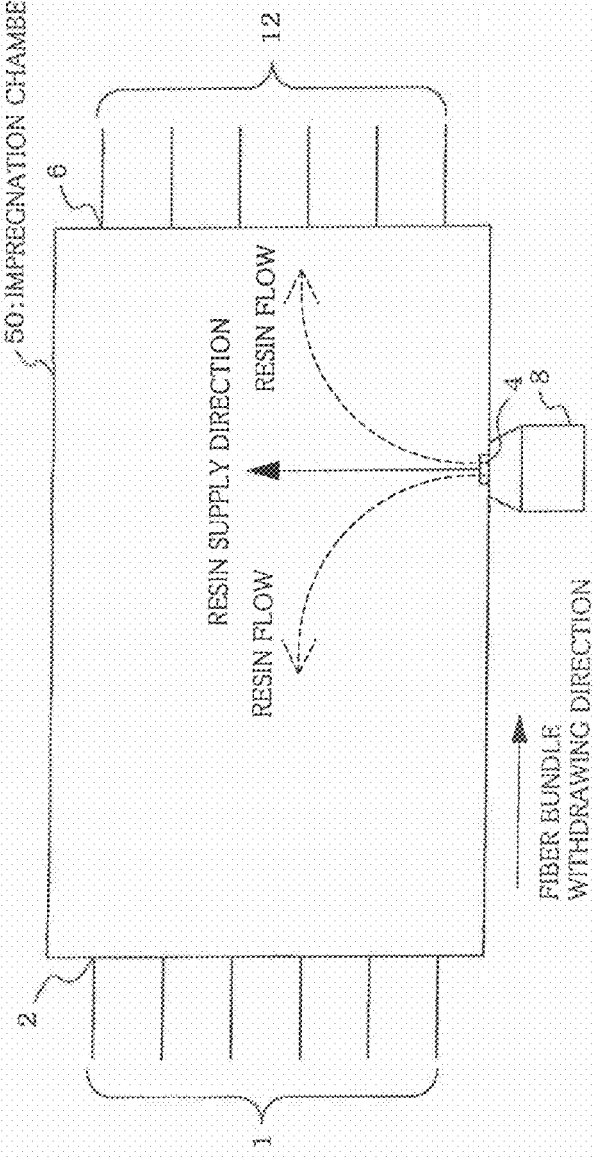
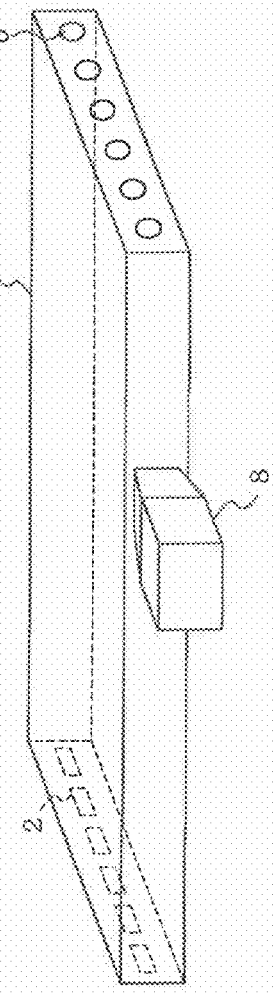
FIG. 9A
FIG. 9B

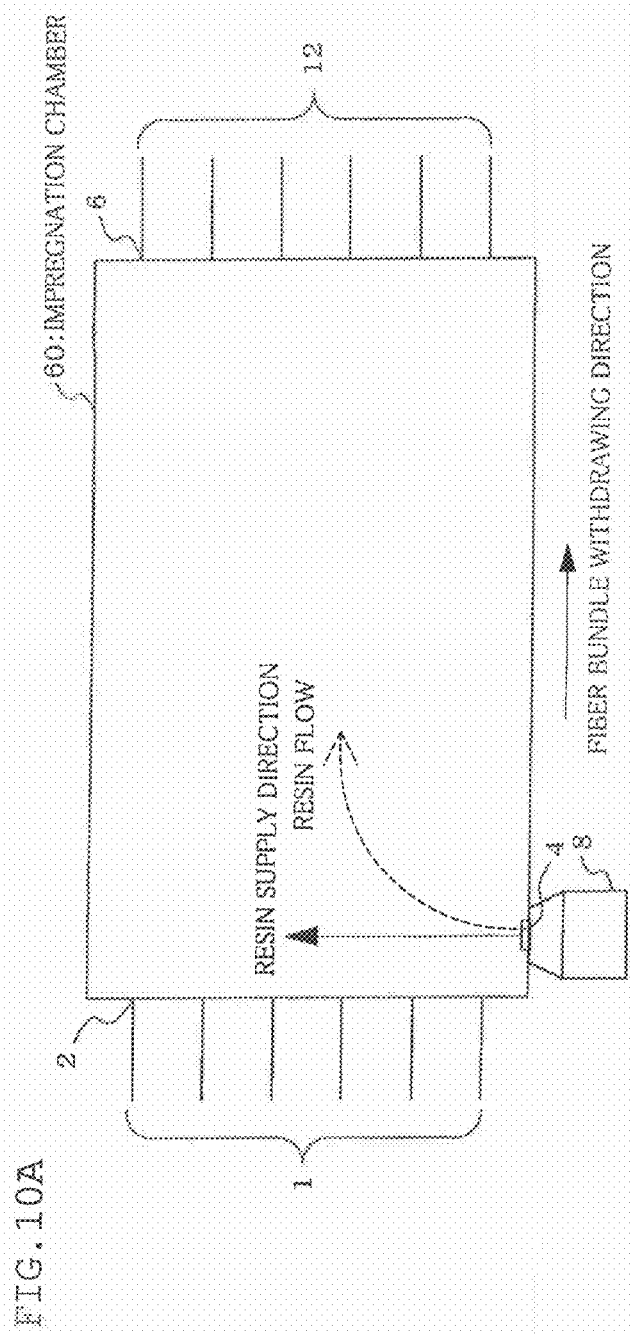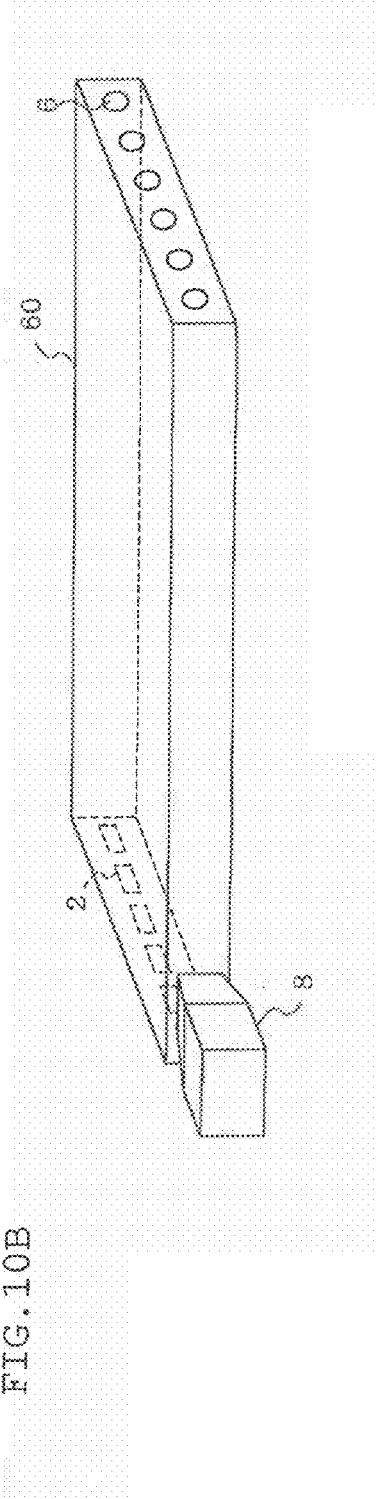

RESIN SUPPLY DIRECTION

METHOD FOR PRODUCING FIBER-REINFORCED RESIN COMPOSITION

TECHNICAL FIELD

The invention relates to a method for producing a fiber-reinforced resin composition.

BACKGROUND ART

In order to improve the impregnation properties of fiber bundles with a resin when producing a fiber-reinforced resin composition, various studies have been made on an impregnation chamber for impregnating the fiber bundles with the resin. As a result of these studies, current production methods can prevent the resulting resin composition from suffering from problems such as poor outward appearance or a decrease in strength when the number of fiber bundles introduced into one impregnation chamber is small.

However, when increasing the size of the device and introducing a number of fiber bundles into one impregnation chamber in order to increase the amount of production, impregnation of the fiber bundles with a resin becomes insufficient even when using the same production method, whereby poor outward appearance caused by unspread glass fibers or the like often occurs in spite of taking various measures. Moreover, the resin may be colored or show deterioration in hue to cause a further deterioration in outward appearance. Therefore, a resin composition mass-produced using a large device is limited in application to products for which particularly good outward appearance is required, or must be colored using a large amount of pigment such as carbon black to cover unspread glass fibers, coloration of the resin, or a change in hue. In particular, black products such as automobile parts suffer from unspread glass fibers, lightly pigmented products such as household articles suffer from coloration (colored foreign matter) and unspread glass fibers, and unpigmented products such as household appliance parts suffer from a change in hue, coloration, and unspread glass fibers.

Patent document 1 discloses a method of impregnating three individual fiber bundles with a molten resin at the same time. However, since this method introduces the resin from one point on one side of a die (impregnation chamber), the flow rate and the resin pressure of the resin differ to a larger extent between the position close to the extruder and the position away from the extruder as the number of fiber bundles is increased. Moreover, since the flow of the resin in the direction perpendicular to the fiber bundle progress direction becomes predominant, outward appearance rapidly deteriorates due to unspread fibers, organic foreign matter, deterioration in hue, and the like. Therefore, application of this method to products for which good outward appearance is required is limited. Moreover, since the resin is not sufficiently supplied to the fiber bundles away from the extruder, the withdrawing rate cannot be increased. This results in poor productivity, there by making it impossible to deal with mass production.

Patent document 2 discloses a method in which a cylindrical die box (impregnation) is disposed in the vertical direction, and four fiber bundles are impregnated at the same time. However, this method has a problem in which the number of fiber bundles to be loaded is limited Moreover, since the volume of the die box must be increased as the number of fiber bundles is increased, only about four fiber bundles can be introduced. Moreover, since the fibers spread using a ring spreader are immediately bound in the ring spreader portion, unspread fibers tend to remain in the resulting molded article. Moreover, since the residence time of the resin is long and the resin tends to be retained in the fiber bundle withdrawing path, colored foreign matter is produced or deterioration in hue occurs. Since the direction of the fiber bundles is perpendicularly changed in the fiber bundle withdrawing path when withdrawing the fiber bundles, the withdrawing rate cannot be increased. Furthermore, since the cylindrical die box is disposed in the vertical direction, it is necessary to supply the resin at a high position. This makes it necessary to install the extruder at a high position, whereby the device installation place and the like are limited.

[Patent document 1] JP-A-10-264152
[Patent document 2] JP-A-7-62246

The invention has been achieved in view of the above-described situation. An object of the invention is to provide a method for producing a fiber-reinforced resin composition capable of mass-producing a fiber-reinforced resin composition (fiber-reinforced resin pellets) with excellent outward appearance.

In order to achieve the above object, the inventor has conducted extensive studies. As a result, the inventor has found the following problems resulting from known methods. Specifically, when increasing the size of the device in order to introduce a number of fiber bundles into one impregnation chambers the resin pressure in the impregnation chamber becomes non uniform due to the pressure loss in the impregnation chamber. When increasing the resin pressure in order to prevent insufficient supply of the resin, it becomes difficult to remove gas from the fiber bundles at a position at which the resin pressure is high such as in the vicinity of the resin flow inlet, whereby the impregnation properties deteriorate. Moreover, since the flow in the direction perpendicular to the fiber bundle progress direction is increased due to an increase in the size of the device, the flow of the resin in the impregnation chamber becomes nonuniform (i.e. unsymmetrical), whereby the resin tends to be retained at a specific area. This increases the average residence time of the resin in the impregnation chambers, whereby coloration of the resin or deterioration in hue is increased.

The inventor has examined the method of supplying the resin to the impregnation chamber and the method of loading the fiber bundles into the impregnation chamber (e.g. supply method loading method, and positions and numbers of resin flow inlets and inlets) based on the above findings. As a result, the inventor has found that it is effective to provide a plurality of resin flow inlets in the impregnation chamber near the fiber bundle inlet to regulate the flow of the resin and reduce the difference in resin pressure in the impregnation chamber. This finding has led to the completion of the invention.

DISCLOSURE OF THE INVENTION

According to the invention, the following methods for producing a fiber-reinforced resin composition and the like are provided.

1. A method for producing a fiber-reinforced resin composition comprising:

supplying a plurality of fiber bundles into an impregnation chamber;

supplying a molten thermoplastic resin from a resin flow inlet into the impregnation chamber so that the amount of the resin flow is almost the same or, each side the direction perpendicular to the fiber bundle progress direction;

contacting the molten thermoplastic resin with the fiber bundles to impregnate the fiber bundles with the molten thermoplastic resin; and withdrawing the fiber bundles impregnated with the molten thermoplastic resin from the impregnation chamber.

2. A method for producing a fiber-reinforced resin composition comprising:

supplying a plurality of fiber bundles into an impregnation chamber;

supplying a molten thermoplastic resin from a resin flow inlet into the impregnation chamber;

contacting the molten thermoplastic resin with the fiber bundles under the resin pressure of the molten thermoplastic resin which is almost the same in the impregnation chamber on each side in the direction perpendicular to the fiber bundle progress direction to impregnate the fiber bundles with the molten thermoplastic resin; and withdrawing the fiber bundles impregnated with the molten thermoplastic resin from the impregnation chamber 3. The method according to 1 or 2 wherein a plurality of the resin flow inlets are symmetrically formed relative to the fiber bundle progress direction.

4. A method for producing a fiber-reinforced resin composition comprising:

supplying a plurality of fiber bundles into a box-shaped impregnation chamber;

supplying a molten thermoplastic resin such that almost no molten thermoplastic resin flows towards in the direction perpendicular to the fiber bundle progress direction in a main section of the impregnation chamber where the fiber bundles are impregnated with the resin;

contacting the molten thermoplastic resin with the fiber bundles to impregnate the fiber bundles with the molten thermoplastic resin; and withdrawing the fiber bundles impregnated with the molten thermoplastic resin from the impregnation chamber.

5. A method for producing a fiber-reinforced resin composition comprising:

supplying a plurality of fiber bundles into a box-shaped impregnation chamber;

supplying a molten thermoplastic resin from a resin flow inlet into the impregnation chamber;

contacting the molten thermoplastic resin with the fiber bundles under the resin pressures of the molten thermoplastic resin which are almost the same at each position in the direction perpendicular to the fiber bundle progress direction in a main section of the impregnation chamber where the fiber bundles are impregnated with the resin to impregnate the fiber bundles with the molten thermoplastic resin; and withdrawing the fiber bundles impregnated with the molten thermoplastic resin from the impregnation chamber.

6. A method for producing a fiber-reinforced resin composition comprising:

supplying a plurality of fiber bundles into a box-shaped impregnation chamber;

supplying a molten thermoplastic resin from a plurality of resin flow inlets through a branched flow path into the impregnation chamber;

contacting the molten thermoplastic resin with the fiber bundles to impregnate the fiber bundles with the molten thermoplastic resin in the impregnation chamber; and withdrawing the fiber bundles impregnated with the molten thermoplastic resin from a plurality of withdrawing outlets.

7. The method according to anyone of 4 to 6 wherein the plurality of resin flow inlets are formed at almost right angles to the fiber bundle progress direction.

8. The method according to any one of 1 to 7 wherein the resin flow inlet is provided near the fiber-bundle supplying side in the impregnation chamber.

9. The methods according to any one of 1 to 8 wherein 2 to 10,000 resins flow inlets are arranged.

10. The method according to any one of 1 to 9 wherein the thermoplastic resin is polypropylene-based resin having a melt flow rate (MFR) of 1 to 800 g/10 min; and fibers forming the fiber bundles are glass fibers having an average diameter of 3 to 30 μm.

11. A fiber-reinforced resin composition obtainable by the method of any one of 1 to 10.

12. An impregnation chamber for impregnating fiber bundles with a molten thermoplastic resin comprising:

an inlet for receiving a plurality of fiber bundles;

a plurality of resin flow inlets, symmetrically formed relative to the fiber bundle progress direction, for receiving a molten thermoplastic resin; and a plurality of outlets for withdrawing the fiber bundles impregnated with the molten thermoplastic resin.

13. An impregnation chamber for impregnating fiber bundles with a molten thermoplastic resin comprising:

an inlet for receiving a plurality of fiber bundles;

a plurality of resin flow inlets, formed at almost right angles to the fiber bundle progress direction, for receiving a molten thermoplastic resin; and a plurality of outlets for withdrawing the fiber bundles impregnated with the molten thermoplastic resin.

14 An impregnation chamber for impregnating fiber bundles with a molten thermoplastic resin comprising:

an inlet for receiving a plurality of fiber bundles, a film-shaped resin flow inlet for receiving a molten thermoplastic resin; and a plurality of outlets for withdrawing the fiber bundles impregnated with the molten thermoplastic resin.

According to the invention, a method for producing a fiber-reinforced resin composition capable of mass-producing a fiber-reinforced resin composition (fiber-reinforced resin pellets with excellent outward appearance can be provided.

Since a resin composition obtained by this method is improved in comparison with a known product in terms of fiber spreading, resin coloration, or hue during molding, the resin composition may be used without limitations for applications in which particularly good outward appearance is required.

BRIEF DESCRIPTION OF THE DRAWINGS

FIG. 1 is a view illustrative of one embodiment of a method for producing a fiber-reinforced resin composition according to the invention, in which (a) is a top view of an impregnation chamber used in this embodiment, and (b) is an oblique view of the impregnation chamber.

FIGS. 5(A) and (B) are views illustrative of another embodiment of a method for producing a fiber-reinforced resin composition according to the invention, in which FIG. 5(A) is a top view of an impregnation chamber used in this embodiment, and FIG. 5(B) is an oblique view of the impregnation chamber.

FIGS. 6(A) and 6(B) is a view illustrative of another embodiment of a method for producing a fiber-reinforced resin composition according to the invention, in which FIG. 6(A) is a top view of an impregnation chamber used in this embodiment, and FIG. 6(B) is an oblique view of the impregnation chamber.

FIGS. 8(A) to 8(C) are views illustrative of yet another embodiment of a method for producing a fiber-reinforced resin composition according to the inventions, in which FIG. 8(A) is a top view of an impregnation chamber used in this embodiment, FIG. 8(B) is a side view of the impregnation chamber, and FIG. 8(C) is an oblique view of the impregnation chamber.

FIGS. 9(A) and 9(B) are views illustrative of one comparative embodiment of a method for producing a fiber-reinforced resin composition according to the invention, in which FIG. 9(A) is a top view of an impregnation chamber used in this comparative embodiments and FIG. 9(B) is an oblique view of the impregnation chamber.

FIGS. 10(A) and 10(B) are views illustrative of another comparative embodiment of a method for producing a fiber-reinforced resin composition according to the invention, in which FIG. 10(A) is a top view of an impregnation chamber used in this comparative embodiments and FIG. 10(B) is an oblique view of the impregnation chamber.

BEST MODE FOR CARRYING OUT THE INVENTION

First Embodiment

Figure 2A:
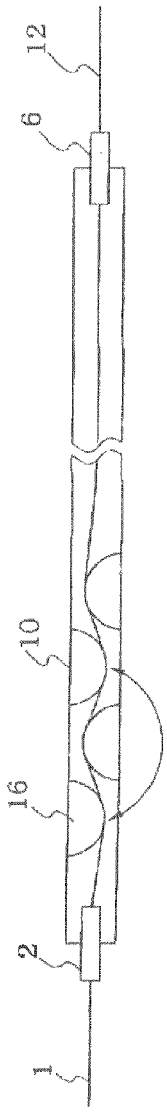
FIGS. 2(A) to (E) are views showing specific examples of a spreading jig.

FIGS. 1(A) to 1(B) are views illustrative of one embodiment of a method for producing a fiber-reinforced resin composition according to the invention, in which FIG. 1(A) is a top view of an impregnation chamber used in this embodiment, and FIG. 1(B) is an oblique view of the impregnation chamber.

In these drawings, a threshold plate (described later) is omitted. Note that fiber bundles and fiber-reinforced resin compositions are not illustrated in FIG. 1(B). This also applies to FIGS. 5(A), 5(B), 6(A), 6(B), 7(A)-7(D), 8(A)-8(C), 9(A)-9(B), and 10(A)-10(B).

The production method according to this embodiment includes a step of loading a plurality of fiber bundles into an impregnation chamber from a plurality of inlets formed in the impregnation chambers, a step of supplying a molten thermoplastic resin to the impregnation chamber from a plurality of resin flow inlets formed in the impregnation chamber almost symmetrically relative to the fiber bundle progress direction, a step of contacting the molten thermoplastic resin and the fiber bundles in the impregnation chamber in a state in which the inlet flow or the resin pressure of the molten thermoplastic resin is almost the same on each side of the impregnation chamber in the direction perpendicular to the fiber bundle progress direction to impregnate the fiber bundles with the molten thermoplastic resin, and a step of withdrawing the fiber bundles impregnated with the molten thermoplastic resin from a plurality of outlets formed in the impregnation chamber.

In the above fiber bundle loading step, it is preferable to preheat fiber bundles 1 at 50 to 400° C. before loading the fiber bundles 1 into an impregnation chamber 10. The preheating temperature is preferably 100 to 350° C., and particularly preferably 150 to 300° C.

If the preheating temperature is less than 50° C., the fibers may not be spread. If the preheating temperature exceeds 400° C., a sizing agent may deteriorate.

The average residence time (=volume of impregnation chamber 10/amount of resin discharged from extruder 8) of the molten thermoplastic resin in the impregnation chamber 10 when contacting the molten thermoplastic resin with the fiber bundles 1 to effect impregnation is usually 0.5 to 150 minutes, preferably 0.5 to 60 minutes, more preferably 0.5 to 40 minutes, still more preferably 0.5 to 30 minutes, particularly preferably 1 to 20 minutes, and most preferably 1 to 15 minutes.

If the average residence time exceeds 150 minutes, colored foreign matter may be produced or yellowing may occur due to deterioration of the resin. If the average residence time is less than 1 minute, the size of the impregnation chamber is limited, whereby mass productivity may be decreased.

The contact time of the fiber bundles and the molten resin is usually 0.2 to 30 seconds, preferably 0.5 to 15 seconds, more preferably 1.0 to 10 seconds, still more preferably 1.0 to 6 seconds, and particularly preferably 1.5 to 6 seconds. If the contact time is less than 0.2 seconds, impregnation may become insufficient. If the contact time exceeds 30 seconds, productivity may be decreased or the residence time of the resin may be increased.

When using a polypropylene-based resin, the temperature of the impregnation chamber is usually 180 to 350° C., preferably 200 to 330° C., more preferably 230 to 320° C., particularly preferably 240 to 310° C., and most preferably 250 to 300° C. If the temperature is less than 180° C., impregnation with the resin becomes difficult. If the temperature exceeds 350° C., the resin may deteriorate. The impregnation chamber is preferably provided with a temperature adjustment (heating or heat retention) mechanism.

The fiber bundle withdrawing rate is usually 10 to 120 m/min, preferably 12 to 100 m/min, more preferably 16 to 100 m/min, particularly preferably 18 to 80 m/min, and most preferably 20 to 60 m/min. If the withdrawing rate is less than 10 m/min, productivity may be decreased. Moreover, colored foreign matter may be produced or the hue may deteriorate due to an increase in the residence time of the resin. If the withdrawing rate exceeds 120 m/min, breakage of the fibers may increasingly occur.

The shape and size of the outlet are not limited A circular or elliptical outlet is preferable in order to shape the fiber bundles. The average diameter of the outlets is preferably 0.5 to 5 mm, more preferably 1 to 4 mm, still more preferably 1.5 to 3.5 mm, and particularly preferably 2 to 3 mm. In order to easily change the shape and size of the outlets, it is preferable to provide the outlet as a replaceable shaping die since a composition with various cross-sectional shapes and sizes can be produced.

In order to achieve mild cooling in a cooling chamber 15 to stabilize the shape of the composition, the temperature of the outlet is preferably 3 to 150° C., more preferably 10 to 120° C., preferably 20 to 100° C., and particularly preferably 20 to 60° C. lower than the temperature of the impregnation chamber. A temperature adjustment (cooling) mechanism may be provided at the outlet in order to achieve the above temperature.

As shown in FIGS. 1(A) and 1(B) the impregnation chamber 10 used in this embodiment includes a plurality of (one on each side) resin flow inlets 4 at symmetrical positions near inlets 2. Impregnation properties are advantageously increased by providing the resin flow inlets 4 near the inlets 2.

If the resin flow inlet 4 is provided at a position higher than that of the resin bundles, the supply of the resin may become unstable. Therefore it is preferable that the resin flow inlet 4 be provided at a position almost equal to or lower than that of the fiber bundles. If the resin flow inlet 4 is provided at a position almost equal to that of the resin bundles, the flow of the resin may become non uniform due to the fiber bundles. Therefore it is preferable that the resin flow inlet 4 be provided at a position lower than that of the fiber bundles. The height of the impregnation chamber may be increased in the vicinity of the resin flow inlet 4 (e.g. protrusion in the shape of the letter L, T, or the like may be formed when viewed from the direction perpendicular to the fiber bundle progress direction) in order to achieve the above conditions. The term "position almost equal to that of the fiber bundles" used herein means that the difference is within about ±1 cm.

The resin flow inlet 4 is connected with an extruder 8 which stores the molten thermoplastic resin. In this embodiment, the molten resin may always leak (drip) through some of the inlets 2 of the impregnation chamber 10. The number of inlets 2 through which the molten resin leaks is preferably 1/2 or less, and more preferably 1/3 or less of the total number of inlets. It is particularly preferable that the molten resin not leak through the inlets 2. It is preferable that the inlet be provided with a slit for adjusting the inlet width.

The size of the inlet cannot be adjusted if a large number of fiber bundles are loaded through one inlet. Therefore, it is preferable to provide a plurality of inlets. It is more preferable that the number of inlets almost coincide with the number of fiber bundles. When providing a plurality of inlets, it is preferable that the inlets be disposed almost linearly or in a zigzag arrangement.

In this embodiment, the impregnation chamber 10 having one resin flow inlet 4 on each side is used so that the inlet flow or the resin pressure of the molten thermoplastic resin extruded from the extruder 8 and supplied to the impregnation chamber 10 through the resin flow inlet 4 is almost the same on each side of the impregnation chamber 10.

The resin pressures are determined to be "almost the same" when the resin pressures are completely the same or the change rate ((maximum pressure−minimum pressure)/maximum pressure ×100%) is about 35%. The change rate is usually 35% or less, preferably 30% or less, more preferably 20% or less, and particularly preferably 15% or less.

The inlet flows are determined to be "almost the same" when the resin inlet flow ratio (=(inlet flow on small inlet flow side)/(inlet flow on large inlet flow side)) is usually 0.5 to 1 preferably 0.6 to 1 more preferably 0.7 to 1, still more preferably 0.8 to 1 particularly preferably 0. 85 to 1, and most preferably 0.9 to 1.

In this embodiment, the molten thermoplastic resin is simultaneously supplied from the resin flow inlets 4 on either side in the resin supply direction to perpendicularly intersect the withdrawing direction of the fiber bundles 1, as indicated by the solid arrow in FIG. 1(A). Since fiber-reinforced resin composition 12 are continuously withdrawn through outlets 6, the molten thermoplastic resin shows symmetrical flowability indicated by the dotted arrows in FIG. 1(A) along with the movement of the fiber bundles 1 in the withdrawing direction. This allows the resin pressure of the molten thermoplastic resin to be almost the same on each side of the impregnation chamber 10.

In this embodiment, when the total length of the impregnation chamber 10 is L and the distance from the inlet 2 to the resin flow inlet 4 is l the ratio l/L is set at usually 0 to 1/2, preferably 0 to 1/3, more preferably 0 to 1/5, still more preferably 0 to 1/10, particularly preferably 0 to 1/20, and most preferably 0. If the ratio l/L exceeds 1/3, the molten thermoplastic resin tends to be retained in the impregnation chamber 10, where by the hue of the resin may deteriorate or colored foreign matter may be produced to a large extent.

The total length L of the impregnation chamber 10 is usually 15 to 300 cm, preferably 30 to 200 cm, more preferably 40 to 180 cm, still more preferably 50 to 160 cm, particularly preferably 60 to 140 cm, and most preferably 70 to 130 cm. If the total length L is less than 15 cm, impregnation becomes difficult, whereby the fibers may not be spread. If the total length L exceeds 300 cm, the residence time of the resin may be increased due to an increase in the volume of the impregnation chamber, whereby coloration or deterioration in hue may occur.

When the width of the impregnation chamber is W and the number of fiber bundles is n, the width (W/n) of the impregnation chamber per fiber bundle is usually 0.3 to 30 cm, preferably 0.5 to 15 cm, more preferably 0.8 to 10 cm, still more preferably 1.2 to 8 cm, particularly preferably 1.6 to 7 cm, and most preferably 2 to 5 cm.

If the width of the impregnation chamber per fiber bundle is less than 0.3 cm, since the width may be insufficient for spreading the fiber bundle, the fibers may not be spread due to insufficient impregnation. If the width of the impregnation chamber per fiber bundle exceeds 30 cm, the residence time may be increased due to an increase in the volume of the impregnation chamber, whereby coloration or deterioration in hue may occur to a large extent.

The ratio W/L of the width W to the total length L of the impregnation chamber is not limited. In the first embodiment, if the ratio W/L is too great, the resin may flow to a large extent in the widthwise direction, whereby deterioration in appearance may occur. The ratio W/L is usually 0.01 to 0.5, preferably 0.03to 0.4, more preferably 0.05 to 0.35, still more preferably 0.07 to 0.3, and particularly preferably 0.1 to 0.25. If the ratio W/L is less than 0.01, it may become difficult to impregnate the fiber bundles with the resin when increasing the number of fiber bundles. If the ratio W/L exceeds 0.5, the resin may flow to a large extent in the widthwise direction, whereby deterioration in appearance may occur.

When the height of the impregnation chamber 10 is H, the ratio L/H is preferably 5 to 200, more preferably 10 to 100, still more preferably 20 to 100, and particularly preferably 30 to 100.

In this embodiment, a spreading jig (e.g. bar, rod, protrusion, or roll) for spreading the fiber bundles 1 and impregnating the fiber bundles 1 with the molten thermoplastic resin is preferably provided in the impregnation chamber 10. Although the spreading jig may be provided outside the impregnation chamber, it is preferable to provide the spreading jig in the impregnation chamber from the viewpoint of excellent impregnation properties.

When the spreading jig is a bar or a protrusion, the curvature (R) of the spreading jig is usually 0.01 to 6 cm, preferably 0.1 to 3 cm, more preferably 0.2 to 2 cm, still more preferably 0.3 to 1.5 cm, and particularly preferably 0.4 to 1 cm. If the curvature is less than 0.01 cm or exceeds 6 cm, breakage of the fibers tends to occur.

When the spreading jig is a bar, the bar may be secured to the impregnation-chamber maybe freely-rotated due to friction with the fiber bundles or the like, or may be power-rotated. It is preferable that the bar be rotated since breakage of the fiber bundles due to friction is reduced.

As the material for the spreading jig, a material which can withstand the heating temperature and exhibits high surface hardness and abrasion resistance is preferable. For examples hard steel such as stainless steel or hard steel provided with hard plating or ceramic spraying on its surface is preferable.

A guiding groove may be provided in the spreading jig.

The number of spreading jigs is usually 1 to 200, preferably 2 to 100, more preferably 4 to 30, still more preferably 5 to 20, particularly preferably 6 to 12, and most preferably 8 to 12. If the number of spreading jigs is less than one, impregnation with the resin may become difficult. If the number of spreading jigs exceeds 200, the fibers tend to break.

FIGS. 2(A) to 2(E) show specific examples of the spreading jig. FIGS. 2(A) to 2(E) are longitudinal cross-sectional views of the impregnation chamber 10 provided with various spreading jigs 16. The fiber bundles 1 introduced through the inlets 2 are spread by zigzagging along the spreading jigs 16 (FIGS. 2(A) and 2(C) to 2(E)) or by passing between the upper and lower spreading jigs 16 (FIGS. 2(B)). The fiber bundles 12 impregnated with the molten thermoplastic resin pass between threshold plates 14 and are continuously withdrawn through the outlets 6 (shaping dies).

The angle of the fiber bundle 1 formed at a position represented by the spreading jig 16 at which the fiber bundle progress direction is changed (θ in FIGS. 2 and 7) is usually 10 to 175°, preferably 100 to 175°, more preferably 110 to 170°, still more preferably 115 to 165°, particularly preferably 120 to 160°, and most preferably 130 to 155°.

If the angle is less than 10°, breakage of the fibers tends to occur. If the angle exceeds 175°, impregnation with the resin may become insufficient.

When providing the spreading jig, an impregnation chamber of which the impregnation chamber lid portion (upper portion) (not shown) can be opened and shut, or separated from the impregnation chamber body portion (lower portion) (not shown) and in which the spreading jig can be installed after loading the fiber bundles 1 in to the impregnation chamber 10 is preferable as the impregnation chamber 10. An impregnation chamber in which the spreading jig is partially secured to the impregnation chamber lid portion is particularly preferable.

A method of forming the exterior portion of the impregnation chamber in the shape of a rectangular tube and inserting a plurality of rods or bars supported by an auxiliary plate or the like is also preferable from the viewpoint of stage replacement work since the fiber bundles can be provided in the impregnation chamber.

The spreading jig (e.g. bar) may be partially disposed in the vertical direction (with respect to the surface of the earth). The fibers are easily provided by disposing the spreading jig in the vertical direction, whereby workability is improved.

When using a bar or a rod as the spreading jig, the arrangement thereof is not limited. It is preferable to arrange the spreading jigs almost linearly along the fiber withdrawing direction (FIGS. 2(C) and (D)). If the spreading jigs are displaced from the straight line to a large extent, the size of the impregnation chamber is increased, whereby the residence time of the resin is increased.

Figure 2B:
Figure 2C:
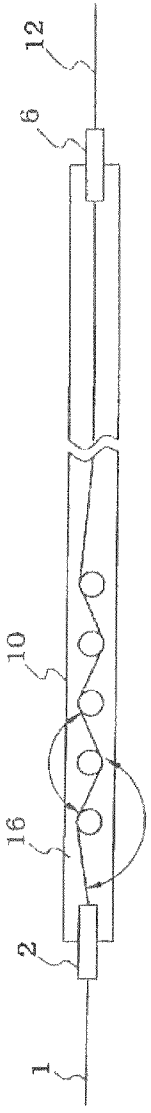
Figure 2D:
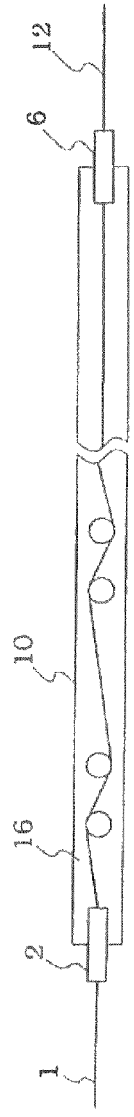
Figure 3:
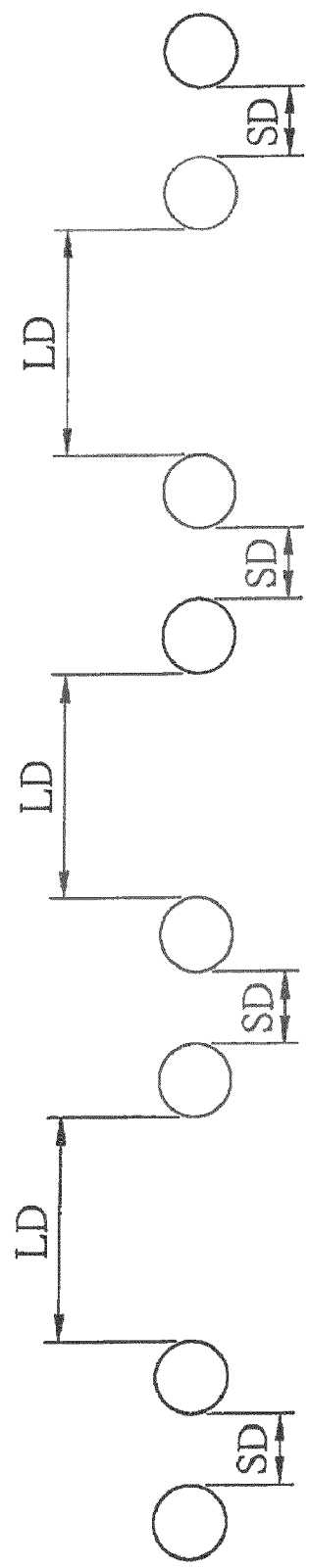
FIG. 3 is a view showing a bar interval.

It is preferable to arrange the spreading jigs such as bars at different intervals (FIG. 2(D)) instead of arranging the spreading jigs at equal intervals (FIG. 2(C)) since the fibers can be efficiently spread and impregnated while reducing breakage of the fibers. It is more preferable to alternately change the intervals between the spreading jigs (FIGS. 3 and FIG. 2(D)). In the case of using a plurality of bars with an average diameter of d (FIG. 3), when the range of the small interval is SD and the range of the large interval is LD, it is preferable that $0.2d \leq SD \leq 2d$ and $2d \leq LD \leq 30d$.

It is more preferable that $0.5d \leq SD \leq 1.5d$ and $3d \leq LD \leq 20d$.

If SD is less than 0.2d breakage of the fibers may be increased, or it may become difficult to provide the fibers. If SD exceeds 2d, the fibers may not be sufficiently spread. If LD is less than 2d, breakage of the fibers may be increased although the fibers may not be sufficiently spread. If LD exceeds 30d, the fiber bundle may be bent due to its weight or the resin flow, or the size of the impregnation chamber may be increased to a large extent.

When using the impregnation chamber 10 provided with the spreading jigs, it is preferable to cause the fiber bundles 1 to pass between a pair of upper and lower spreading jigs when spreading the fiber bundles 1 and impregnating the fiber bundles 1 with the molten thermoplastic resin. The fiber bundles 1 may or may not contact the spreading jigs. It is preferable that the fiber bundles 1 contact the spreading jigs. It is preferable that each pair of spreading jigs contact the upper and lower sides of the impregnation chamber 10.

When using the impregnation chamber 10 provided with the spreading jig, it is preferable to provide the resin flow inlet 4 closer to the inlet 2 than the second spreading jig from the inlet 2. It is more preferable to provide the resin flow inlet 4 at the same position as the first spreading jig from the inlet 2. It is particularly preferable to provide the resin flow inlet 4 closer to the inlet 2 than the first spreading jig from the inlet 2.

If the resin flow inlet 4 is positioned closer to the outlet 6 than the second spreading jig from the inlet 2 since the resin does not flow along the fiber bundles, impregnation may become insufficient.

The distance between the outlet 6 and the last spreading jig which contacts or becomes close to the fiber bundles 1 in the impregnation chamber 10 is usually 8 to 80 cm, preferably 12 to 80 cm, more preferably 16 to 80 cm, still more preferably 20 to 80 cm, particularly preferably 20 to 60 cm, and most preferably 25 to 0 cm. If the distance is less than 8 cm, the fibers may be insufficiently spread in the impregnation chamber 10 due to the tension of the fiber bundles 1 whereby the fiber bundles 1 may not be sufficiently impregnated with the molten thermoplastic resin. If the distance exceeds 80 cm, the size of the impregnation chamber 10 may be increased, whereby the residence time of the molten thermoplastic resin may be increased.

The distance between the inlet 2 and the first spreading jig which contacts or becomes close to the fiber bundles 1 is usually 3 to 80 cm, preferably 6 to 60 cm, more preferably 8 to 60 cm, still more preferably 8 to 30 cm, and particularly preferably 12 to 30 cm. If the distance is less than 3 cm, the effect of spreading the fiber bundles may be insufficient. If the distance exceeds 80 cm, the size of the impregnation chamber may be increased to a large extent.

In order to prevent breakage of the fibers due to contact between the fiber bundles 1 and to rectify the molten thermoplastic resin, it is preferable to provide a threshold plate rectifying plate) partially between the fiber bundles 1 in the impregnation chamber 10. It is particularly preferable to provide the threshold plate at a position at which the spreading jig for spreading the fiber bundles 1 is provided and/or a position near the resin flow inlet.

When providing the threshold plate at a position near the resin flow inlet, the molten thermoplastic resin is easily rectified by disposing one or more resin flow inlets between the threshold plates.

The length of the threshold plate is usually 1/50 or more, preferably 1/10 or more, more preferably 1/3 or more, still more preferably 1/2 or more, particularly preferably 3/4 or more, and most preferably 1/1 of the length L of the impregnation chamber. If the length of the threshold plate is less than 1/50 of the length L, the rectifying effects may be insufficient.

Figure 4A:
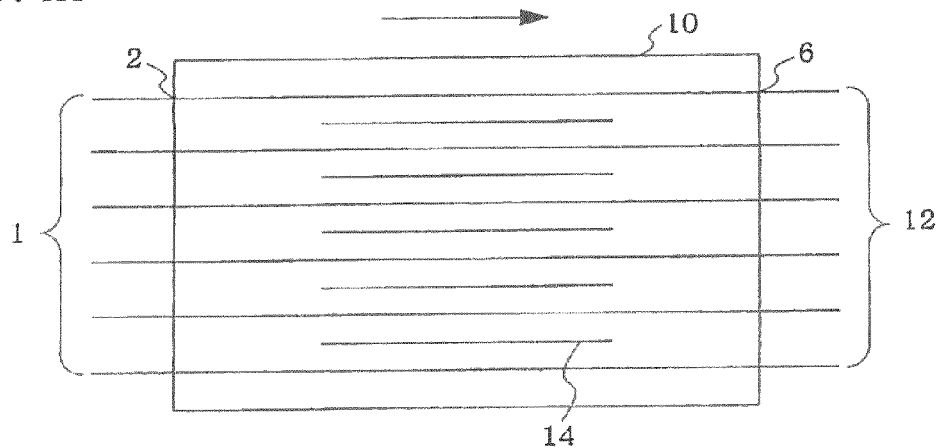
FIGS. 4(A) to (C) are views showing arrangement examples of a threshold plate.
Figure 4B:
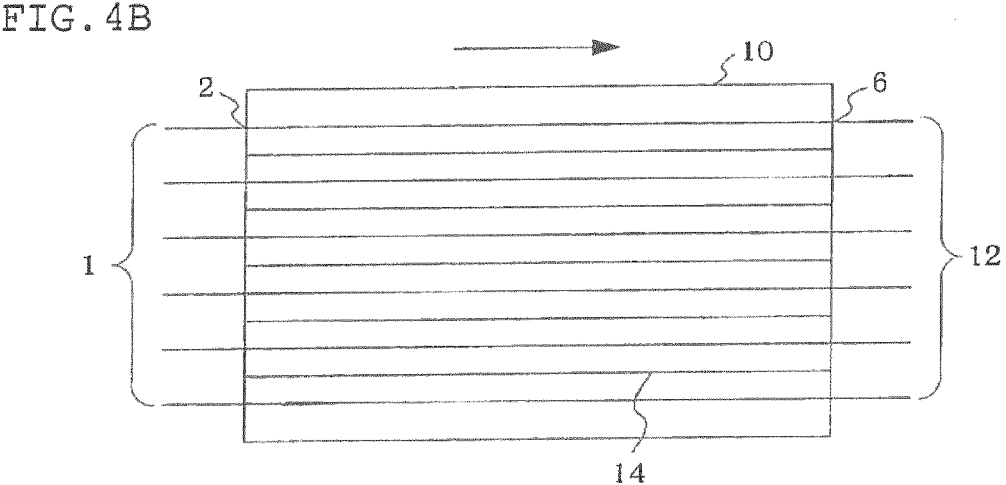
Figure 4C:
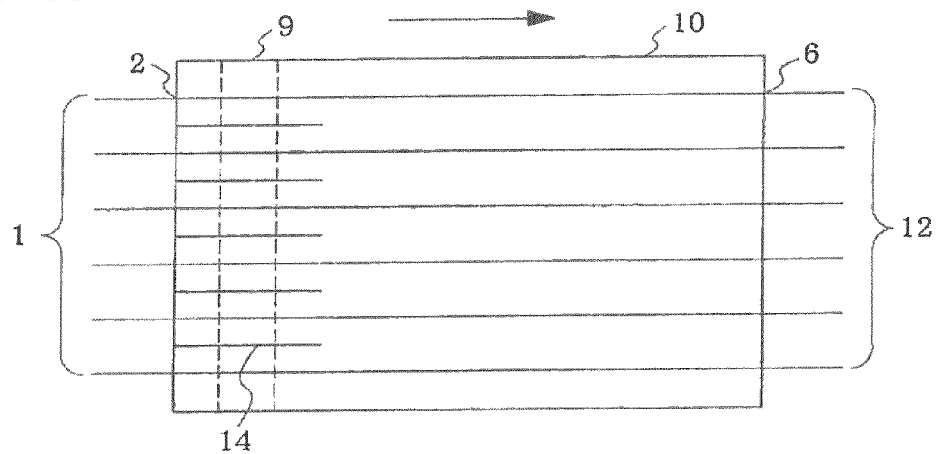

FIGS. 4(A) to 4(C) show examples of the threshold plate (rectifying plate). The arrow shown in FIGS. 4(A) to 4(C) indicates the fiber bundle withdrawing direction. FIG. 4(A) shows an example in which the threshold plate 14 is formed between the fiber bundles 1 along the withdrawing direction in part of the impregnation chamber 50 in the longitudinal direction, FIG. 4(B) shows an example in which the threshold plate 14 is formed along the withdrawing direction over the entire impregnation chamber 50 in the longitudinal direction, and FIG. 4(C) shows an example in which the threshold plate 14 is formed in the portion of a branching die 9. The length, position, number, and the like of the threshold plate are not limited to those shown in the drawings.

In this embodiment the resin flow inlets are symmetrically formed relative to the fiber bundle progress direction. Note that the resin flow inlets may not be symmetrically formed insofar as the amount of the inlet flow or the resin pressure of the molten thermoplastic resin is almost the same on each side of the impregnation chamber in the direction perpendicular to the fiber bundle progress direction. The resin flow inlets on either side need not be the same or correspond to each other in terms of the position, number, shape, and size.

As the extruder for melting the thermoplastic resin, a short-screw extruder, a twin-screw extruder, a vented twin-screw extruder, or the like may be used without limitation. The number of extruders for supplying the molten resin to one impregnation chamber is not limited. The number of extruders is preferably 1 to 4, more preferably 1 to 2, and particularly preferably 1 from the viewpoint of the balance between the amount of resin extruded and the amount of production, and the equipment cost.

Specifically, it is preferable to branch the resin melted using one extruder and supply the resin to the impregnation chamber through a plurality of resin flow inlets since the resin is stably supplied in an equal amount.

The size of the resin flow inlet is usually 0.5 to 3000 mm$^2$, preferably 1 to 1600 mm$^2$, more preferably 2 to 900 mm$^2$, still more preferably 3 to 400 mm$^2$ and particularly preferably 4 to 100 mm$^2$.

If the size of the resin flow inlet is less than 0.5 mm$^2$, the resin flow rate may become insufficient or clogging tends to occur. Moreover, a turbulent flow may occur near the resin flow inlet. If the size of the resin flow inlet exceeds 3000 mm$^2$, a difference in inlet flow may occur between the inlet ports (i.e. a larger amount of resin may flow through the inlet port positioned closer to the extruder).

Second Embodiment

FIGS. 5(A)-5(B) are views illustrative of another embodiment of a method for producing a fiber-reinforced resin composition according to the invention, in which FIG. 5(A) is a top view of an impregnation chamber used in this embodiment, and FIG. 5(B) is an oblique view of the impregnation chamber.

The production method according to this embodiment includes a step of loading a plurality of fiber bundles into an impregnation chamber from a plurality of inlets formed in the impregnation chamber, a step of supplying a molten thermoplastic resin into the impregnation chamber from a plurality of resin flow inlets formed in the impregnation chamber at almost right angles to the fiber bundle progress direction, a step of contacting the molten thermoplastic resin and the fiber bundles in the impregnation chamber in a state in which the resin pressure of the molten thermoplastic resin is almost the same in the impregnation chamber to impregnate the fiber bundles with the molten thermoplastic resin, and a step of withdrawing the fiber bundles impregnated with the molten thermoplastic resin from a plurality of outlets formed in the impregnation chamber.

Specifically, the production method according to this embodiment differs from the production method according to the first embodiment in that an impregnation chamber 20 is used instead of the impregnation chamber 10. The remaining features of this embodiment may be the same as those of the first embodiment.

As shown in FIGS. 5(A) and 5(B) the impregnation chamber 20 used in this embodiment includes a plurality of (six) resin flow inlets 4 at the bottom near the inlets 2. The resin flow inlets 4 are connected with the extruder 8 which stores the molten thermoplastic resin through the branching die 9.

In this embodiment, the impregnation chamber 20 having a plurality of resin flow inlets 4 at the bottom is used so that the resin pressure of the molten thermoplastic resin extruded from the extruder 8 and supplied to the impregnation chamber 20 from the resin flow inlet 4 through the branching die 9 is almost the same in the impregnation chamber 20. The term "almost the same" is the same as defined above. The term "almost the same in the impregnation chamber 20" means that the resin pressures at positions (e.g. A, B, and C in FIG. 12) at the same distance from the inlet-side (side opposite to the outlet) side surface in the impregnation chamber 20 are almost the same Note that the molten thermoplastic resin is supplied in a state in which the resin substantially does not flow in the direction perpendicular to the withdrawing direction.

In this embodiment, since the molten thermoplastic resin is simultaneously supplied from the resin flow inlets 4 in the resin supply direction to be parallel to the withdrawing direction of the fiber bundles 1, as indicated by the solid arrow in FIG. 5(A), the molten thermoplastic resin shows specific flowability in the impregnation chamber 20. This allows the resin pressure of the molten thermoplastic resin to be almost the same in the impregnation chamber 20.

In this embodiment, the resin flow inlets are formed at almost right angles to the fiber bundle progress direction. Note that the arrangement of the resin flow inlets is not limited thereto insofar as the molten thermoplastic resin is supplied so that the molten thermoplastic resin substantially does not flow in the direction perpendicular to the fiber bundle progress direction in a main section of the impregnation chamber 20 in which the fiber bundles are impregnated with the resin, or the fiber bundles are caused to contact and are impregnated with the molten thermoplastic resin under the resin pressure of the molten thermoplastic resin which is almost the same in the main section at each position in the direction perpendicular to the fiber bundle progress direction. The resin flow inlets may not be formed linearly (e.g. zigzag arrangement).

The term "main section in which the fiber bundles are impregnated with the resin" refers to a "section in which the resin and the fiber bundles contact in a state in which the fiber bundles are spread to a certain extent". In general, the term "main section" refers to a "section from the vicinity of the first impregnation jig to the vicinity of the last an impregnation jig (viewed from the inlet)" when providing the spreading jigs in the impregnation chamber, and refers to a "section from the contact point of the fiber bundles and the resin" to the vicinity of the fiber bundle binding point (generally the outlet) (viewed from the inlet) when loading the spread fiber bundles. The length of the "main section in which the fiber bundles are impregnated with the resin" is usually 1/10 or more, preferably 1/5 or more, more preferably 1/3 or more/still more preferably 1/2 or more, particularly preferably 2/3 or more, most preferably 3/4 or more, and ideally 4/5 or more of the length L of the impregnation chamber.

If the length of the main section is less than 1/10 of the length L, the length of the impregnation chamber maybe increased for the impregnation efficiency, whereby the residence time of the resin may be increased. This may cause poor outward appearance due to coloration, a change in hue, or the like.

The term "substantially does not flow in the lateral direction" means that "the flow in the fiber bundle progress direction is predominant over the flow in the direction perpendicular to the fiber bundle progress direction" or "the amount of flow or the flow rate at each position in the direction perpendicular to the fiber bundle progress direction is almost the same". The above state may be confirmed by observing the presence of a pattern mainly which flows in the fiber bundle progress direction or the absence of a pattern which flows in the direction perpendicular to the fiber bundle progress direction or diagonally intersects the fiber bundle progress direction or a pattern which meanders to a large extent using a known flow visualization method (e.g. a method of adding a small amount of coloring agent to the resin during production and observing the flow pattern or a method of forming a window using quartz or the like and optically observing a change in refractive index or the like using polarized light),for example. The inside of the impregnation chamber may be observed using a method of forming an observation window, a method of stopping supply of the resin and disassembling the impregnation chamber after the resin has been solidified or the like. When it is difficult to confirm the above state, a model of the same shape as the impregnation chamber may be formed of a transparent material (e.g. glass, acryl, or polycarbonate), a fluid (e.g. lubricating oil) having almost the same viscosity as the resin with which the fiber bundles are impregnated may be caused to flow inside the model, and the fluid may be observed using the above method.

A small inflow which occurs near the resin flow inlet or the impregnation jig, or a turbulent flow accompanying the progress of the fiber bundles is preferably small. Note that such a phenomenon may be disregarded insofar as the entire resin flow direction is not affected to a large extent (i.e. a pattern which flows in the direction perpendicular to the fiber bundle progress direction or diagonally intersects the fiber bundle progress direction, or a pattern which meander to a large extent is absent).

The resin flow inlets need not have the same shape. The shape of the resin flow inlet is not limited. A circular or elliptical resin flow inlet is preferable since the resin is easily rectified. The resin flow inlets need not have completely the same size. It is preferable that resin flow inlets have a similar size. If the resin flow inlets considerably differ in size, the amount of resin supplied tends to vary to a large extent, whereby the resin may not be rectified.

Third Embodiment

Figure 6A:
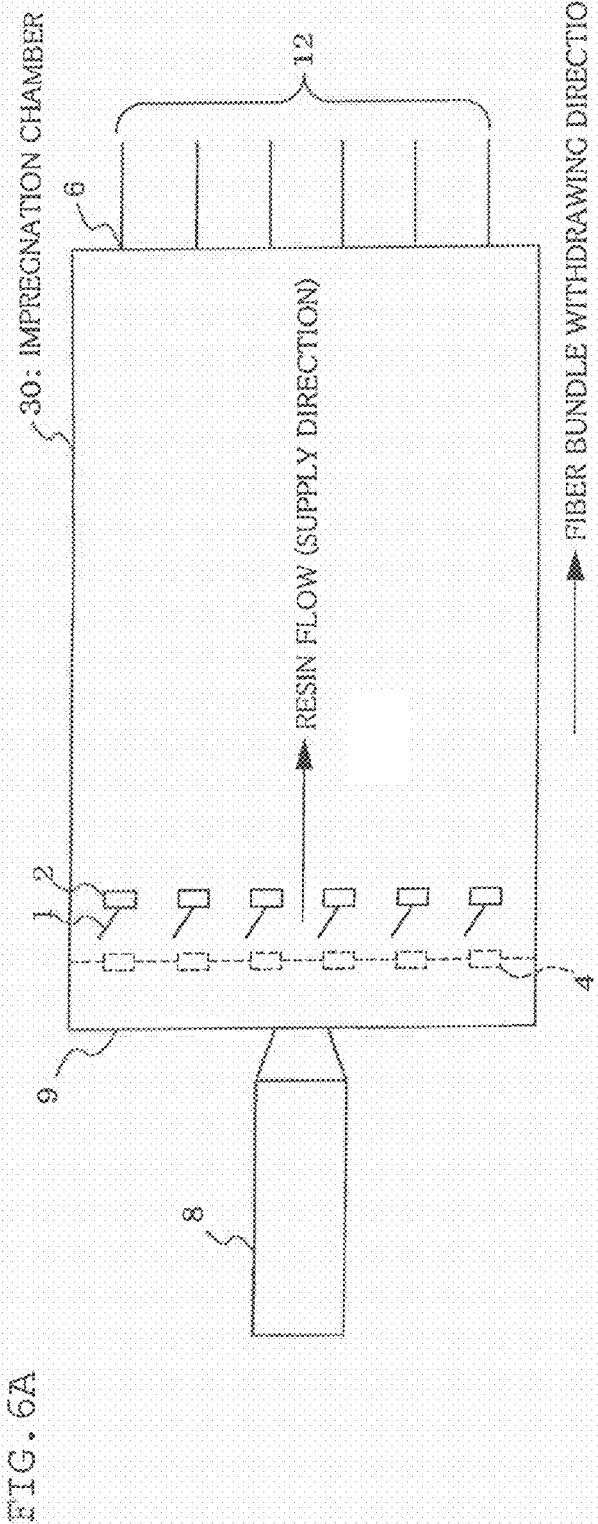
Figure 6B:
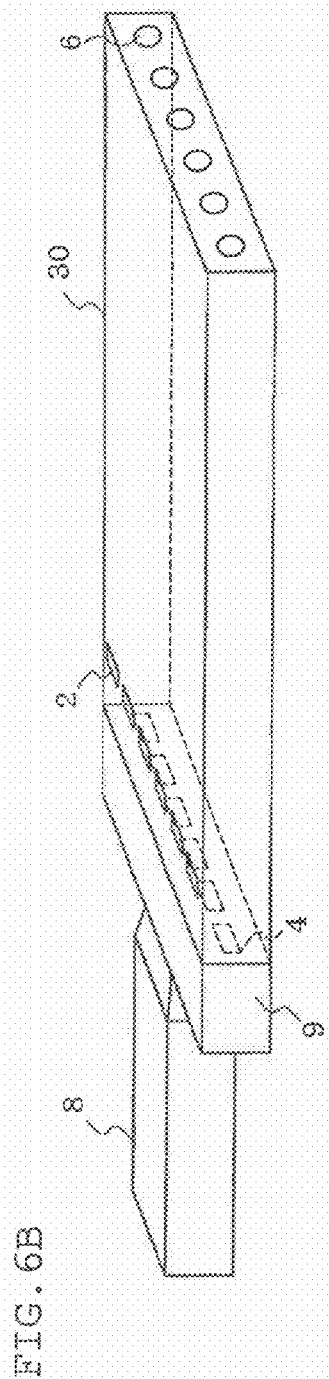

FIGS. 6(A)-6(B) are views illustrative of another embodiment of a method for producing a fiber-reinforced resin composition according to the invention, in which FIG. 6(A) is a top view of an impregnation chamber used in this embodiment, and FIG. 6(B) is an oblique view of the impregnation chamber.

The production method according to this embodiment includes a step of loading a plurality of fiber bundles into an impregnation chamber from a plurality of inlets formed in the impregnation chamber, a step of supplying a molten thermoplastic resin into the impregnation chamber from a plurality of resin flow inlets formed in the impregnation chamber at almost right angles to the fiber bundle progress direction, a step of contacting the molten thermoplastic resin and the fiber bundles in the impregnation chamber in a state in which the resin pressure of the molten thermoplastic resin is almost the same in the impregnation chamber to impregnate the fiber bundles with the molten thermoplastic resin, and a step of withdrawing the fiber bundles impregnated with the molten thermoplastic resin from a plurality of outlets formed in the impregnation chamber.

Specifically, the production method according to this embodiment differs from the production method according to the first embodiment in that an impregnation chamber 30 is used instead of the impregnation chamber 10. The remaining features of this embodiment maybe the same as those of the first embodiment.

As shown in FIGS. 6(A) and 6(B), the impregnation chamber 30 used in this embodiment includes the inlets 2 for the fiber bundles 1 in the top surface and a plurality of (six) resin flow inlets 4 in the side surface on the side of the inlets 2. The resin flow inlets 4 are connected with the extruder 8 which stores the molten thermoplastic resin through the branching die 9.

In this embodiment, the impregnation chamber 30 having a plurality of resin flow inlets 4 in the side surface on the side of the inlets 2 is used so that the amount of the inlet flow of the molten thermoplastic resin extruded from the extruder 8 and supplied to the impregnation chamber 30 from the resin flow inlets 4 through the branching die 9 is made uniform, and the resin pressure is almost the same in the impregnation chamber 30.

In this embodiment, since the molten thermoplastic resin is simultaneously supplied from the resin flow inlets 4 in the resin supply direction to be parallel to the withdrawing direction of the fiber bundles 1 in the same manner as in the second embodiment, the molten thermoplastic resin shows specific flowability in the impregnation chamber 30. This allows the amount of the inlet flow of the molten thermoplastic resin to be made uniform, and allows the resin pressure to be almost the same in the impregnation chamber 30.

FIGS. 7(A) to 7(D) show specific examples of the spreading jig which may be used in this embodiment. FIGS. 7(A) to 7(D) are longitudinal cross-sectional views of the impregnation chamber 30 provided with various spreading jigs 16. The fiber bundles 1 introduced through the inlets 2 are spread by zigzagging along the spreading jigs 16. The fiber bundles 12 impregnated with the molten thermoplastic resin pass between the threshold plates 14 and are continuously withdrawn through the outlets 6.

It is preferable to provide a glass roving closer to the outlet than the inlet 2 from the viewpoint of industrial production since the installation area is reduced.

Figure 7A:
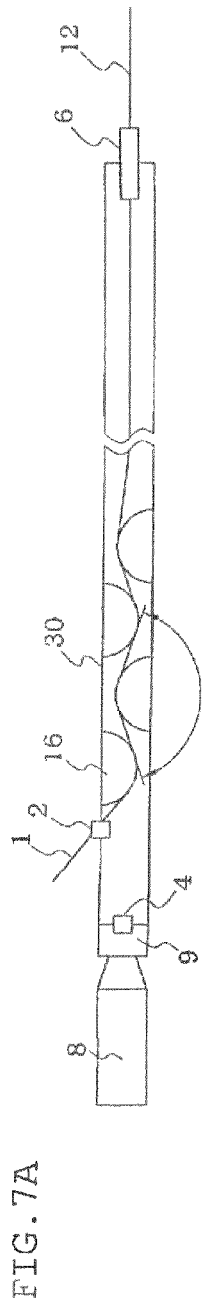
FIGS. 7(A) to 7(D) are views showing specific examples of a spreading jig.
Figure 7B:
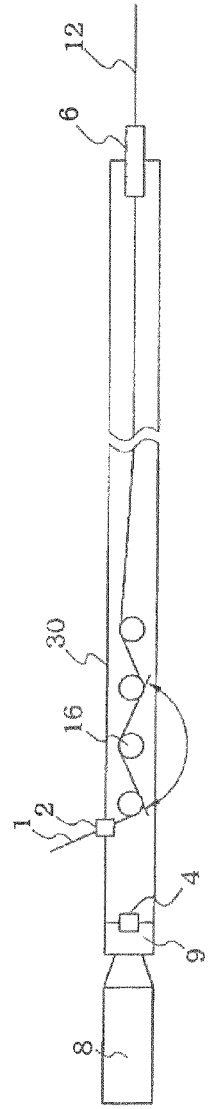
Figure 7C:
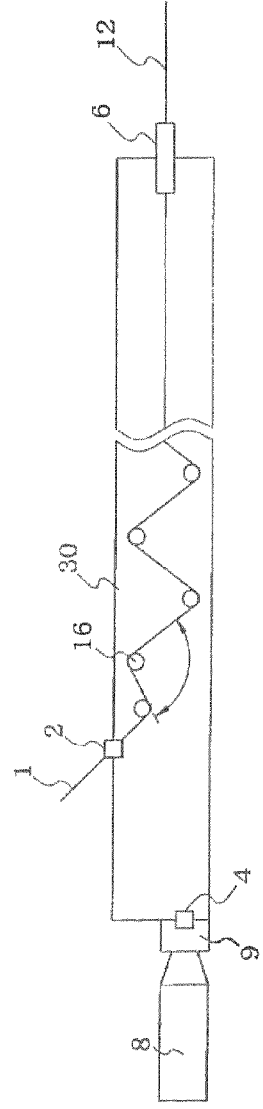
Figure 7D:
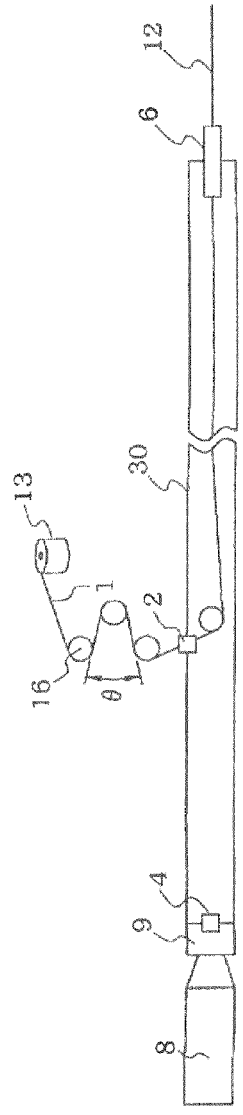

FIG. 7(D) shows an example in which the spreading jigs 16 are provided outside the impregnation chamber 30.

It is preferable that the resin flow inlet be positioned almost on the extension line of the fiber bundle in the withdrawing direction (i.e. FIG. 7(B) is preferable to FIG. 7(C)). If the resin flow inlet is not positioned on the extension line, the resin may be retained.

In this embodiment, the resin flow inlets are formed at almost right angles to the fiber bundle progress direction. Note that the arrangement of the resin flow inlets is not limited there to in so far as the resin pressure of the molten thermoplastic resin is almost the same in impregnation chamber 20. The resin flow inlets may not be formed linearly. The resin flow inlets need not have the same shape and size.

In the second and third embodiments, the resin flow inlets and the inlets may be formed in different surfaces of the impregnation chamber, or may be formed in a single surface. The second and third embodiments may be combined with the resin flow inlets according to the first embodiment.

In order to prevent the resin from overflowing through the inlet, it is preferable to take preventive measures such as increasing the height of the inlet or providing a slit.

Fourth Embodiment

FIGS. 8(A)-8(C) are views illustrative of yet another embodiment of a method for producing a fiber-reinforced resin composition according to the invention, in which FIG. 8(A) is a top view of an impregnation chamber used in this embodiment, FIG. 8(B) is a side view of the impregnation chamber, and FIG. 8(C) is an oblique view of the impregnation chamber.

The production method according to this embodiment includes a step of loading a plurality of fiber bundles into an impregnation chamber from a plurality of inlets formed in the impregnation chamber, a step of supplying a molten thermoplastic resin into the impregnation chamber from one resin flow inlet, a step of contacting the molten thermoplastic resin and the fiber bundles in the impregnation chamber in a state in which the resin pressure of the molten thermoplastic resin is almost the same in the impregnation on chamber to impregnate the fiber bundles with the molten thermoplastic resin, and a step of withdrawing the fiber bundles impregnated with the molten thermoplastic resin from a plurality of outlets formed in the impregnation chamber.

Specifically, the production method according to this embodiment differs from the production method according to the first embodiment in that an impregnation chamber 40 and a fan-shaped inflow die 23 are used instead of the impregnation chamber 10. The remaining features of this embodiment may be the same as those of the first embodiment.

As shown in FIGS. 8(A) to 8(C), the impregnation chamber 40 used in this embodiment includes the inlets 2 for the fiber bundles 1 in the top surface and one film-shaped resin flow inlet 24 on the side surface on the side of the inlets 2. The film-shaped resin flow inlet 24 is connected with the extruder 8 which stores the molten thermoplastic resin through the fan-shaped inflow die 23.

In this embodiment, since the film-shaped resin flow inlet 24 is open along the longitudinal direction in which the inlets 2 are arranged, the amount of the inlet flow of the molten thermoplastic resin supplied to the impregnation chamber 30 through the resin flow inlet 24 is made uniform, and the resin pressure is almost the same in the impregnation chamber 40.

In this embodiment, since the molten thermoplastic resin is simultaneously supplied from the resin flow inlet 24 in the resin supply direction to be parallel to the withdrawing direction of the fiber bundles 1 in the same manner as in the third embodiment the molten thermoplastic resin shows specific flowability in the impregnation chamber 40. This allows the amount of the inlet flow of the molten thermoplastic resin to be made uniform, and allows the resin pressure to be almost the same in the impregnation chamber 40.

The fan angle α is usually 10 to 170°, preferably 30 to 160°, more preferably 50 to 150°, and particularly preferably 70 to 150°. If the angle is less than 10°, the length of the device is increased to a large extent. If the angle exceeds 170°, the rectifying effects may be decreased.

The resin flow inlet is preferably in the shape of a film with a thickness smaller than the height of the impregnation chamber. The ratio (W1/W2) of the width W1 of the resin flow inlet to the width W2 of the impregnation chamber is usually 0.5 to 1 and preferably 0.7 to 1. If the ratio (W1/W2) is less than 0.5, the resin may flow in the impregnation chamber in the direction perpendicular to the fiber bundle progress direction The ratio (t/H) of the average thickness t of the inflow die to the height H of the impregnation chamber is usually 0.5 or less, preferably 0.3 or less, more preferably 0.2 or less, and particularly preferably 0.1 or less. If the ratio (t/H) of the average thickness t of the inflow die to the height H of the impregnation chamber is less than 0.5, the resin pressure may not be equal on each side (right and left).

In this embodiment, the fan-shaped inflow die is used instead of a plurality of resin flow inlets. Note that a film-shaped inflow die may also be used.

In the case where the number of fiber bundles is increased, it is preferable to use a plurality of resin flow inlets in order to prevent an increase in the total length of the device.

First Comparative Embodiment

FIGS. 9(A) and 9(B) are views illustrative of a comparative embodiment of a method for producing a fiber-reinforced resin composition according to the invention, in which FIG. 9(A) is a top view of an impregnation chamber used in this comparative embodiment, and FIG. 9(B) is an oblique view of the impregnation chamber.

The production method according to this comparative embodiment differs from the production method according to the first embodiment in that an impregnation chamber 50 is used instead of the impregnation chamber 10.

As shown in FIGS. 9(A) and 9(B), the impregnation chamber 50 used in this comparative embodiment includes one resin flow inlet 4 near the outlets 6. The resin flow inlet 4 is connected with the extruder 8 which stores the molten thermoplastic resin.

In this embodiment, since the molten thermoplastic resin is supplied from the resin flow inlet 4 in the resin supply direction to perpendicularly intersect the withdrawing direction of the fiber bundles 1, as indicated by the solid arrow in FIG. 9(A), and the fiber-reinforced resin composition 12 is continuously withdrawn through the outlets 6, the molten thermoplastic resin shows flowability indicated by the dotted arrows in FIG. 9(A) along with the movement of the fiber bundles 1 in the withdrawing direction. Therefore, this embodiment has a problem in which the resin pressure of the molten thermoplastic resin differs in each portion of the impregnation chamber 50. Moreover, the resin which has flowed in a direction differing from the fiber bundle withdrawing direction tends to undergo convection. As a result, the resulting resin composition suffers from problems such as poor outward appearance in the same manner as a known composition.

Second Comparative Embodiment

FIGS. 10(A) and 10(B) are views illustrative of another comparative embodiment of a method for producing a fiber-reinforced resin composition according to the invention, in which FIG. 10(A) is a top view of an impregnation chamber used in this comparative embodiment, and FIG. 10(B) is an oblique view of the impregnation chamber.

The production method according to this comparative embodiment differs from the production method according to the first embodiment in that an impregnation chamber 60 is used instead of the impregnation chamber 10.

As shown in FIGS. 10(A) and 10(B), the impregnation chamber 60 used in this comparative embodiment includes one resin flow inlet 4 near the inlets 2. The resin flow inlet 4 is connected with the extruder 8 which stores the molten thermoplastic resin.

In this comparative embodiment, since the molten thermoplastic resin is supplied from the resin flow inlet 4 in the resin supply direction to perpendicularly intersect the withdrawing direction of the fiber bundles 1, as indicated by the solid arrow in FIG. 10(A), and the fiber-reinforced resin composition 12 is continuously withdrawn through the outlets 6, the molten thermoplastic resin shows flowability indicated by the dotted arrows in FIG. 9(A) along with the movement of the fiber bundles 1 in the withdrawing direction. Therefore, this embodiment also has a problem in which the resin pressure of the molten thermoplastic resin differs in each portion of the impregnation chamber 60, whereby the resulting resin composition suffers from problems such as poor outward appearance in the same manner as a known composition.

The preferred embodiments of the invention have been described above. Note that the invention is limited to the above embodiments.

For example, the number of resin flow inlets 4 is two in the first embodiment and six in the second and third embodiments. In the invention, the number of resin flow inlets may be appropriately adjusted in the range of 1 to 10,000.

The number of resin flow inlets is preferably 2 to 10,000, more preferably 4 to 10,000, still more preferably 6 to 10,000, particularly preferably 8 to 10,000, and most preferably 10 to 100.

The flow of the resin is more easily rectified as the number of resin flow inlets becomes larger. On the other hand, if the number of resin flow inlets exceeds 10,000, clogging tends to occur due to a decrease in the size of the resin flow inlet.

When the number of fiber bundles 1 is n and the number of resin flow inlets 4 is m, the ratio (m/n) is 0.4 (=2/5) in the first embodiment and 1 (=6/6) in the second and third embodiments in the invention, the ratio (m/n) may be appropriately adjusted in the range of 0.1 to 50. The ratio (m/n) is preferably 0.3 to 50, more preferably 0.5 to 10, still more preferably 0.7 to 5, particularly preferably 1 to 5, and most preferably 1 to 2. If the ratio (m/n) is less than 0.2, the flow of the molten thermoplastic resin is not rectified, whereby colored foreign matter is produced due to coloration or the like. Moreover, a high resin pressure portion may occur, whereby impregnation with the resin may become insufficient If the ratio (m/n) exceeds 50, it is difficult to arrange the resin flow inlets. Even if the resin flow inlets can be arranged, clogging easily occurs due to a decrease in the size of the resin flow inlets. The number n of fiber bundles 1 is usually 2 to 200, preferably 5 to 200, more preferably 6 to 200, still more preferably 8 to 100, particularly preferably 10 to 100, and most preferably 12 to 50. If the number n is less than 2, productivity is decreased. If the number n exceeds 200, fiber conversion or the like takes time.

The number of outlets 6 is usually 2 to 200, preferably 4 to 200, more preferably 6 to 200, still more preferably 8 to 200, particularly preferably 10 to 100, and most preferably 16 to 50. The number of outlets 6 generally coincides with the number n of fiber bundles.

The minimum distance between the fiber bundle and the resin flow inlet closest to the fiber bundle is usually 20 cm or less, preferably 15 cm or less, more preferably 12 cm or less, still more preferably 9 cm or less, particularly preferably 6 cm or less, and most preferably 3 cm or less.

If he minimum distance is greater than 20 cm, the flow of the resin may become nonuniform or a difference in pressure may occur, whereby the fibers may not be spread or poor outward appearance such as coloration or deterioration in hue may occur when forming a composition.

Figure 11:
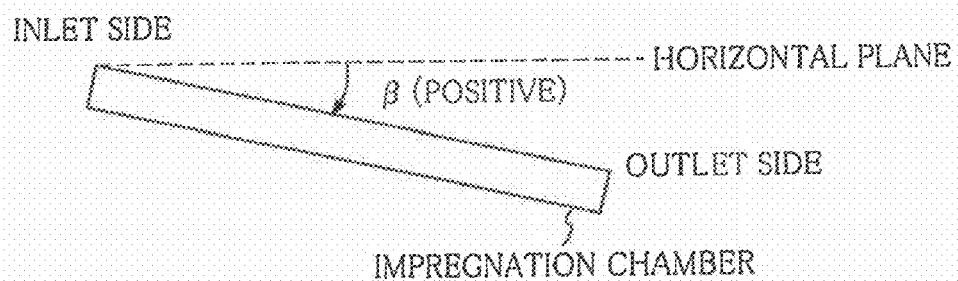
FIG. 11 is a view showing an impregnation chamber installation angle.

The installation angle $\beta$ of the impregnation chamber with respect to the horizontal plane (see FIG. 11) is usually $-30$ to $+80°$, preferably $-1$ to $+30°$, more preferably 0 to $+20°$, still more preferably 0.1 to $+15°$, particularly preferably $+0.5$ to $+10°$, and most preferably $+1$ to $+50°$.

If the angle $\beta$ is less than $-30°$, the resin may not uniformly flow toward the outlets, or the amount of resin in the impregnation portion may become insufficient. If the angle $\beta$ exceeds $80°$, the resin pressure inside the outlets may be increased, or it may become difficult to install the device due to an increase in the total height of the device, or it may become difficult to introduce the fiber bundles into the cooling chamber.

It is preferable that the inlet side height and the outlet side height of the impregnation chamber be independently adjusted so that the angle $\beta$ can be adjusted.

If the impregnation chamber is almost parallel to the horizontal plane or diagonally disposed downward to some extent with respect to the horizontal plane (i.e. the angle $\beta$ is positive), the impregnation portion rarely lacks the resin. It is particularly preferable that the impregnation chamber be diagonally disposed downward to some extent with respect to the horizontal plane (i.e. the angle $\beta$ is positive) since the resin pressure gradually increases toward the outlets. This is advantageous for impregnation.

The angle ($\theta'$) formed by the molten thermoplastic resin supply direction to the impregnation chamber and the fiber bundle withdrawing direction is $90°$ in the first embodiment and $0°$ in the second and third embodiments. In the invention the angle ($\theta'$) may be appropriately adjusted in the range of $0° \leq \theta' \leq 90°$. The angle ($\theta'$) is preferably $0° \leq \theta' \leq 60°$, more preferably $0° \leq \theta' \leq 30°$, particularly preferably $0° \leq \theta' \leq 10°$, and most preferably $0°$.

The angle (bending angle) formed by the fiber bundle progress direction in the impregnation chamber and the fiber bundle withdrawing direction from the impregnation chamber is usually $45°$ or less, preferably $30°$ or less, more preferably $20°$ or less, and particularly preferably $10°$ or less. If the angle is greater than $45°$, the fibers tend to break.

The method of cooling the fiber bundles withdrawn from the impregnation chamber is not particularly limited. A known method such as air cooling, water cooling, or stream cooling may be utilized. A water cooling method is generally utilized. The temperature of water is preferably 10 to $70°$ C., more preferably 15 to $60°$ C., still more preferably 20 to $50°$ C., and particularly preferably 25 to $45°$ C.

If the temperature of water is less than $10°$ C., pellets may break due to rapid cooling. If the temperature of water exceeds $70°$ C., pellets may be crushed due to insufficient cooling.

The cooling time is usually 0.1 to 15 seconds, preferably 0.2 to 7 seconds, more preferably 0.4 to 4 seconds, still more preferably 0.6 to 3 seconds, particularly preferably 0.8 to 2 seconds, and most preferably 1 to 1.8 seconds. If the cooling time is less than 0.1 second, pellets may be crushed due to insufficient cooling. If the cooling time exceeds 15 seconds, pellets may break due to overcooling.

The shape of the impregnation chamber is not limited. It is preferable that the impregnation chamber be in the shape of a box (approximately rectangular parallelepiped) If the impregnation chamber is in the shape of a column or a triangular prism, the residence time of the resin may be increased due to an increase in volume.

When the impregnation chamber is in the shape of a box, the number of fiber bundles is easily increased in comparison with other shapes. The term "box (approximately rectangular parallelepiped)" used here in means a rectangular parallelepiped or a three-dimensional shape similar to a rectangular parallelepiped, and does not strictly mean a rectangular parallelepiped. Specifically, the impregnation chamber may partially have a portion (irregular portion) which has a different height, widths or length (i.e. the cross section may be in the shape of the letter L or T). It suffices that the main portion of the impregnation chamber be formed of an approximately planar surface The term "planar surface" used herein means an approximately planar surface and does not necessarily mean a (mathematically) planar surface.

The shape of the resin flow inlet is not limited. Various shapes as shown in FIGS. 12(A)-12(D) may be utilized. When the resin flow inlet protrudes (FIG. 12(D)), the height h of the protrusion is preferably 10 cm or less, more preferably 5 cm or less, and still more preferably 3 cm or less. A shape with no protrusion (FIG. 12(A)) or a tapered shape (FIGS. 12(B) and 12(C) is particularly preferable unless other shapes are preferred for specific reasons. If the height h of the protrusion is greater than 10 cm, a turbulent flow may occur near the resin outlet. This may cause the entire resin flow to be disturbed, thereby resulting in poor outward appearance.

Figure 13A:
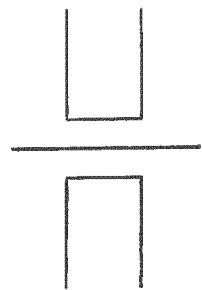
FIGS. 13(A)-13(C) are views showing examples of the shape of an inlet.
Figure 13B:
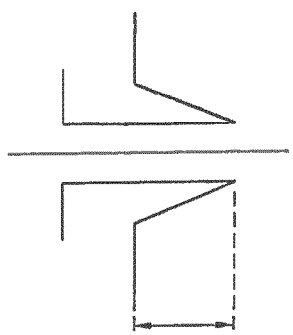
Figure 13C:
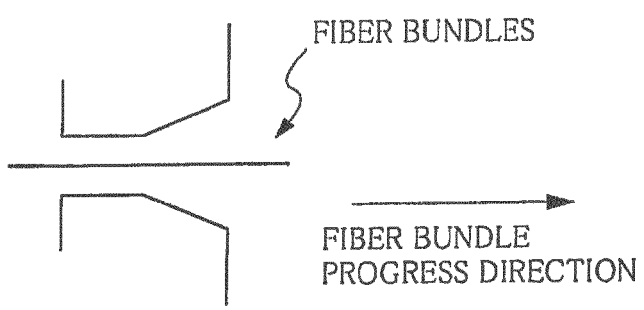

The shape of the fiber bundle inlet is not limited. Various shapes as shown in FIGS. 13(A)-13(C) may be utilized. When the resin flow inlet protrudes (FIG. 13(B), the height h' of the protrusion is preferably 10 cm or less, more preferably 5 cm or less, and still more preferably 3 cm or less. A shape with no protrusion (FIG. 13(A)) or a tapered shape (FIGS. 13(C)) is particularly preferable unless other shapes are preferred for specific reasons. If the height h' of the protrusion is greater than 10 cm, a turbulent flow may occur near the fiber bundle inlet. This may cause the entire resin flow to be disturbed, thereby resulting in poor outward appearance.

Figure 14A:
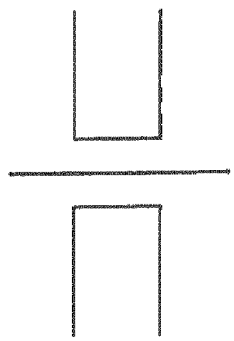
FIGS. 14(A)-14(C) are views showing examples of the shape of an outlet or shaping die.
Figure 14B:
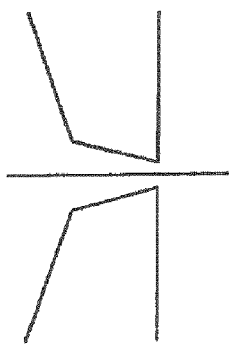
Figure 14C:
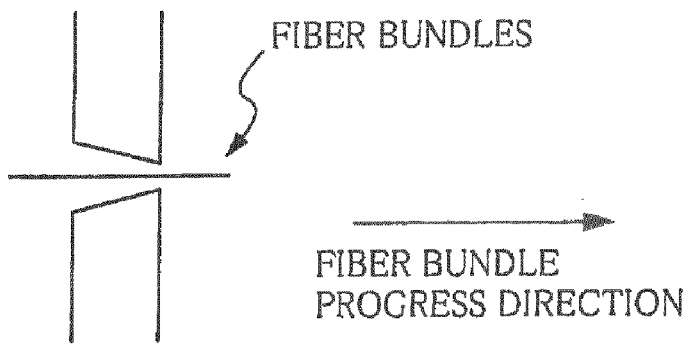

The shape of the fiber bundle outlet (or shaping die) is not limited. Various shapes as shown in FIGS. 14(A)-14(C) may be utilized.

The arrangement of the flow regulating plate is limited when providing the inlets in the side surfaces of the impregnation chamber (FIGS. 1(A), 9(A)-(B), and 10(A)-(B)) Therefore, it is preferable to provide the inlets at the bottom of the impregnation chamber or in the inlet-side side surface (FIGS. 5(A)-5(B), 6(A)-6(B), and 8(A)-8C)).

The angle formed by the fiber bundle progress direction and the horizontal plane is usually −30 to +90°, preferably −1 to +80°, more preferably 0 to +20°, still more preferably +0.1 to +15°, particularly preferably +0.5 to +10°, and most preferably +1 to +5°. When the impregnation chamber is in the shape of a box (almost rectangular parallelepiped), the above angle coincides with the installation angle β of the impregnation chamber.

In the production method according to the invention, conditions of methods disclosed in Japanese Patent No. 3234877, literature ("Seikei Kakou", Vol. 5, No. 7, page 454 (1993), and other known methods may be applied.

Examples of such methods include a method of using a noncontact impregnation jig (WO97/19805), a method of using an auxiliary pin (JP-A-11-58377), a method of forming a plurality of fiber bundles into one fiber (strand) using cake glass fibers (JP-A-6-114830), a method of spreading fibers using air (JP-A-8-163726), a method of spreading fibers using a plurality of protrusions (JP-A-6-293023), a method of spreading fibers using a meandering bent portion (JP-A-6-293023), a method of utilizing an introduction guide having a curved surface (JP-A-10-249855), a method of forming a joint portion between an extruder and an impregnation chamber in a specific shape (JP-A-7-80910), a method of spreading fiber bundles, causing the fiber bundles to pass through resin back flow preventive slits, and then introducing the fiber bundles into an impregnation chamber (JP-A-5-29381), a method of adjusting the internal pressure using a pressure gage (JP-A-6-254976), a method of using a glass roving with a small variation in sizing agent (JP-A-5-50520), a method of using a jig of which the contact portion with glass fiber bundles exhibits higher abrasion resistance than a noncontact portion with glass fiber bundles (JP-A-7-304037), a method of spreading fibers using a fiber bundle spreading device heated at the melting point or more of a binder and impregnating the fiber bundle using an impregnation device (JP-A-7-68544), and the like.

The amount of production per device is usually 30 kg/hour or more, preferably 40 kg/hour or more, more preferably 50 kg/hour or more, still more preferably 70 kg/hour or more, particularly preferably 90 kg/hour or more, and most preferably 110 kg/hour or more.

The amount of production per installation is determined by the pellet diameter, the withdrawing rate, and the number of fiber bundles.

Fiber-reinforced resin compositions which differ in composition ratio or property parameter may be produced using the production method according to the invention by appropriately changing the conditions.

As the resin composition produced by the method according to the invention, a resin composition is preferable which includes (I) fibers with a length of 2 to 200 mm and a diameter of 3 to 30 μm in an amount of preferably 20 to 75 mass %, more preferably 35 to 65 mass %, particularly preferably 40 to 60 mass %, and most preferably 40 to 55 mass %, and (II) a thermoplastic resin in an amount of preferably 80 to 25 mass %, more preferably 65 to 35 mass %, particularly preferably 60 to 40 mass %, and most preferably 60 to 45 mass %.

If the amount of fibers exceeds 75 mass %, impregnation may become insufficient If the amount of fibers is less than 20 mass %, the reinforcing effects may become insufficient.

This composition includes the fibers (I) arranged almost in parallel in the thermoplastic resin (II) and has a yellowness index (YI) of preferably 0 to 20, more preferably 0 to 15, particularly preferably 0 to 12, and most preferably 0 to 10.

If the yellowness index (YI) is greater than 20, the yellowness index (YI) of the molded article is increased, whereby the outward appearance may become poor.

When producing pellets from this composition, the content of colored foreign matter (e.g. coloration or dark spot) with a diameter of 30 cm or more (number of pellets containing colored foreign matter/number of all pellets) is usually 0.08% or less, preferably 0.05% or less, more preferably 0.02% or less, still more preferably 0.01% or less, particularly preferably 0.005% or less, and most preferably 0.002% or less.

If the content of colored foreign matter with a diameter of 30 μm or more exceeds 0.1%, poor outward appearance of the molded article may occur at an increased rate.

The spreading properties of the pellets formed of the composition measured using the method described in the examples is usually 0 to 35 per sheet, preferably 0 to 20 per sheet, more preferably 0 to 15 per sheet, still more preferably 0 to 10 per sheet, particularly preferably 0 to 6 per sheet, most preferably 0 to 3 per sheet, and ideally 0 per sheet. If the spreading properties are greater than 35 per sheet, the fibers may appear on the surface of the molded article, whereby the outward appearance deteriorates even if the molded article is colored to decrease the yield.

The diameter of the pellets formed of the composition is usually 0.5 to 4 mm, preferably 1.0 to 3.4 mm, more preferably 1.5 to 3 mm and particularly preferably 1.8 to 2.6 mm. If the diameter is less than 0.5 mm, productivity may be decreased. If the diameter exceeds 4 mm, formation using a small machine may become difficult.

The length of the pellets formed of the composition is usually 1 to 200 mm, preferably 2 to 50 mm, more preferably 3 to 20 mm, still more preferably 4 to 12 mm, particularly preferably 5 to 10 mm, and most preferably 6 to 8 mm. If the length is less than 1 mm, the reinforcing effects may become insufficient. If the length exceeds 200 mm, formation may become difficult.

As suitable examples of the fiber (I), glass fiber, carbon fiber, metal fiber, organic fiber, and the like can be given. Of these, a glass fiber is preferable. In particular, a glass fiber treated with a coupling agent or an emulsion is more preferable.

The diameter of the class fibers is usually 3 to 30 μm, preferably 11 to 30 μm, more preferably 15 to 30 μm, and particularly preferably 17 to 25 μm.

If the diameter is less than 3 μm, impregnation may become difficult due to an increase in the surface area. If the diameter exceeds 30 μm, sufficient strength may not be obtained.

As a fiber bundle formed by binding such fibers, a commercially available glass roving may be directly used. Several pieces of a roving formed of a small number of cake fibers or glass fibers (filaments) disclosed in JP-A-6-114830 or JP-A-11-138534 may be bound to form a fiber bundle.

The number of glass fibers (filaments) per fiber bundle is usually 400 to 36,000, preferably 1,200 to 30,000, more preferably 2,000 to 24,000, still more preferably 2,000 to 12,000, and particularly preferably 2,000 to 8,000.

If the number of glass fibers is less than 400, the width of the pellet may be reduced. If the number of glass fibers exceeds 36,000, impregnation may become insufficient.

When using a roving as the fiber bundle, the roving tex is usually 100 to 10,000 g/km, preferably 500 to 5,000 g/km, more preferably, 000 to 4,000 g/km, still more preferably 2,250 to 3,000 g/km, and particularly preferably 2,300 to 2,500 g/km. if the roving tex is less than 100 g/km, handling may become difficult. If the roving tex exceeds 10,000 g/km, the size of the pellets may be increased to a large extent.

The following products can be given as examples of commercially available glass rovings treated with a coupling agent or emulsion.

(1) Asahi Fiber-Glass Co., Ltd. ER2220 (diameter: 16 μm, using aminosilane coupling agent and olefin-based emulsion, number of fibers: about 4000), ER740 (diameter: 13 μm, using aminosilane coupling agent and olefin-based emulsion, number of fibers: about 2000)
(2) Nippon Electric Glass Co., Ltd. ER2310T-441N (diameter: 17 μm, using aminosilane coupling agent and olefin-based emulsion, number of fibers: about 4000)
(3) Central Glass Co., Ltd. ERS2310-LF701 (diameter: 17 μm, using aminosilane coupling agent and urethane-olefin-based mixed emulsion, number of fibers: about 4000), ERS2310-LF702 (diameter: 17 μm, using aminosilane coupling agent and urethane-based emulsion, number of fibers: about 4000)
(4) NSG Vetrotex K.K. R099 2400 P319 (diameter: 17 μm, using aminosilane coupling agent and olefin-based emulsion, number of fibers: about 4000)

As examples of the thermoplastic resin (II), a polyolefin resin, a polystyrene-based resin, a polyamide-based resin, a polycarbonate-based resin, an ethylene-vinyl alcohol copolymer resin, ABS, AS, POM, SAS, polyethylene terephthalate, PBT, LCP, PES, PPS, PES, PES, PSR, and the like can be given. Of these, a polyolefin-based resin such as a polypropylene-based resin and a polyethylene-based resin and a polyamide-based resin can be given as suitable examples. In particular, a polypropylene-based resin is most preferable.

The thermoplastic resin (II) may include elastomers such as styrene elastomers and olefin elastomers, fillers such as talc, mica, graphite, glass flake, and glass beads, additives such as antioxidants, weatherproof agents, metal deactivators, flame retardants, and nucleating agents, and coloring agents such as carbon black, zinc sulfide, and pigments.

A plurality of thermoplastic resins may be alloyed and used in the thermoplastic resin.

As the polypropylene-based resin, a commercially available polypropylene-based resin may be used. A commercially available polypropylene-based of which the fluidity is adjusted using an organic peroxide, or a mixture of commercially available polypropylene-based resins may also be used.

Examples of commercially available propylene-based resin are given below.

1. Idemitsu Kosan Co., Ltd.
(1) Propylene homopolymer J-2003GP (MFR=21), J-2000GP (MFR=21), J-903GP (MFR=13), J-900GP (MFR=13), J-700GP (MFR=8), J-3003GV (MFR-30), J-3000GV (MFR=30), J-3000GP (MFR=30), H-100M (MFR=0.5), H-700 (MFR=7), Y-200GP (MFR=20), Y-6005GM (MFR=60), E-105GM (MFR=0.5), F-300SV (MFR=3), Y-400GP (MFR=4), H-50000 (MFR=500)
(2) Propylene-ethylene block copolymer J-6083HP (MFR=60), J-5066HP (MFR=50), J-5051HP (MFR=50), J-3054HP (MFR=40), J-3056HP (MFR=40), J-950HP (MFR=32), J-762HP (MFR=13) J-466HP (MFR=3), JR3070HP (MFR=30), J-786HV (MFR=13), M142E (MFR=2), J-5085H (MFR=50), J=3054 (MFR=30), J-785H (MFR=12), J-784HV (MFR=12)
(3) Propylene-ethylene random copolymer J-3021GA (MFR=30), J-3021GR (MFR=30), J-2021GR (MFR=20)
2. SunAllomer, Ltd.
(1) Propylene homopolymner PM900M (MFR=30), PM900A (MFR=30), PM802A (MFR=20) PM801Z (MFR=13), PM600Z (MFR=7.5), PM600M (MFR=7.5), PM600H (MFR=7.5), PM600A (MFR=7.5), PF-611 (MFR=30), PF-814 (MFR=3).
(2) Propylene-ethylene block copolymer PMB70X (MFR = 63), PMB65X (MFR=63), PMB60W (MFR=63), PMB60A (MFR=6,3), PMA60Z (MFR=45), PMA80X (MFR=43), PMA60A (MFR=43), PM965C (MFR=35), PM953M (MFR=30), PM761A (9.5)
(3) Propylene-ethylene random copolymer PVC20M (MFR=85), PMC20M (MFR=85), PMA20V (MFR=45), PV940M (MFR=30), PM822V (MFR=20), PM811M (MFR=13) PM731V (MFR=9.5)
3. Japan Polypropylene Corporation (Novatec-PP)
(1) Propylene homopolymer MA3 (MFR=11), MA3AH (MFR=12), MA03 (MFR=25)
(2) Propylene-ethylene random copolymer BC06C (MFR=60) BC05B (MFR=50) BC03GS ((MFR=30), BC03B (MFR=30), BC03C (MFR=30), BC2E (MFR=16), BC3L (MFR=10), BC3H (MFR=8.5), BC3F (MFR=8.5) BC4ASW (MFR=5), BC6DR (MFR=2.5), BC6C (MFR=2.5), BC8 (MFR=1.8)

4. Mitsui Chemical, Inc. (Mitsui Polypro)
(1) Propylene homopolymer J139 (MFR=50), J136 (MFR=20), CJ700 (MFR=10), J108M (MFR=45), J107G (MFR=30), J106G (MFR=15), J105G (MFR=9)
(2) Propylene-ethylene block copolymer J709UG (MFR=55), J708UG (MFR=45), j830HV (MFR=30), J717ZG (MFR=32), J707EG (MFR=30), J707G (MFR=30), J715M (MFR=9), J705UG (MFR=9), J704UG (MFR=5), J702LB (MFR=1.8)
(3) Propylene-ethylene random copolymer J229E (MFR=52), J226E (MFR=20)

It is preferable that the thermoplastic resin (II) be a polypropylene-based resin at least partially modified with an unsaturated carboxylic acid or its derivative (hereinafter called "modifying agent") and having a melt flow rate (MFR) of 1 to 800 g/10 min (hereinafter called "modified polypropylene-based resin")

The MFR is preferably 10 to 400 g/10 min, more preferably 25 to 400 g/10 min, still more preferably 50 to 300 g/10 min, particularly preferably 70 to 200 g/10 min, and most preferably 90 to 150 g/10 min. If the MFR is less than less than 1 g/10 min, it is difficult to impregnate the fibers with the resin. If the MFR exceeds 800 g/10 min, toughness or impact strength may be decreased or the amount of colored foreign matter may be increased. Moreover, forming or plasticization may become unstable.

The molecular weight distribution (Mw/Mn) measured by GPC is usually 2.3 to 10, preferably 2.4 to 9, more preferably 2.5 to 8, still more preferably 2.8 to 7, particularly preferably 3 to 6, and most preferably 3.5 to 5. If the molecular weight distribution is less than 2.3, warping may occur or the forming process may become unstable.

A polypropylene-based resin which is at least partially modified with an unsaturated carboxylic acid or its derivative may be produced by mixing a polypropylene-based resin and a modified polypropylene-based resin or directly modifying part of a polypropylene-based resin.

As the method of modifying a polypropylene-based resin, a known method such as a method disclosed in JP-A-8-127697, JP-A-7-316239 JP-A-8-134318, JP-A-8-143739, JP-A-2002-20560, or the like may be used.

When producing a polypropylene-based resin by mixing a polypropylene-based resin and a modified polypropylene-based resin, a commercially available modified polypropylene-based resin or a polypropylene-based resin produced therefor may be used as the modified polypropylene-based resin. The limiting viscosity thereof is usually 0.3 to 2.0 g/1, preferably 0.45 to 1.25 g/1, more preferably 0.5 to 1.0 g/1, and particularly preferably 0.65 to 0.85 g/1. If the limiting viscosity is less than 0.3 or exceeds 2.0, the strength of the composition may be insufficient.

The amount of acid added measured by FTIR is usually 0.01 to 20 mass %, preferably 0.3 to 10 mass %, more preferably 0.4 to 2.9 mass %, still more preferably 0.5 to 1.8 mass %, and particularly preferably 0.6 to 1.2 mass %. If the amount is less than 0.01 mass %, adhesion between the fibers and the resin may be decreased. If the amount exceeds 20 mass %, an odor may occur.

As the commercially available modified polypropylene-based resin, Polybond 3200, Polybond 3150 (manufactured by Uniroyal), U-mex 1001, U-mex 1010 (manufactured by Sanyo Chemical Industries, Ltd.), Admer QE800 (manufactured by Mitsui Chemicals Ltd.), Polytac H-1000P, Polytac H-3000P (manufactured by Idemitsu Kosan Co., Ltd.), and the like may be used without limitation.

As examples of the modifier, maleic acid, maleic anhydride, fumaric acid, acrylic acid, methacrylic acid, itaconic acid, propiolic acid, oleic acid, and the like can be given.

Of these, an unsaturated dicarboxylic acid is preferable with maleic acid or maleic anhydride being particularly preferable.

The MFR is measured in accordance with JIS K7210:1999 at a temperature of 230° C. and a load of 2.16 kg.

The resin composition obtained using the production method according to the invention may be formed in the shape of pellets. A molded article may be obtained by various known forming methods using the resulting pellets.

When forming the resin composition, additives such as a thermoplastic resin, blowing agent, antioxidant, weather resistant agent, pigment, metal deactivator, flame retardant, and nucleating agent may be added, as required.

EXAMPLES

The invention is described below in detail by way of examples. Note that the invention is not limited to the following examples.

Materials used in the examples and comparative examples are as follows.

<Polypropylene-based Resin>
PP-A: product produced by decomposing J-300GP (polypropylene homopolymer manufactured by Idemitsu Kosan Co., Ltd., MFR=30) with peroxide to adjust the MFR to 60
PP-B: J-2000GP (propylene homopolymer manufactured by Idemitsu Kosan Con, Ltd., MFR=21)
PP-C: product produced by decomposing J-3000GP (propylene homopolymer manufactured by Idemitsu Kosan Co, Ltd., MFR=30) with peroxide to adjust the MFR to 120
PP-D: product produced by decomposing J-3000GP (propylene homopolymer manufactured by Idemitsu Kosan Co., Ltd., MFR=30) with peroxide to adjust the MFR to 500

The MFR was measured in accordance with ASTM D-1238 (load: 2.16 kg, temperature: 230° C.).

<Acid-modified Polypropylene-based Resin>
MAH-PP: Admer QE800 (manufactured by Mitsui Chemicals Inc.) (maleic anhydride-modified propylene homopolymer, limiting viscosity [η]=1.65 g/1, amount of acid added=0.5%, YI=8)

<Class Fiber>
GF: ER2310T-441N (diameter: 17 μm, aminosilane coupling agent and olefin-based emulsion, number of fibers: about 4000, manufactured by Nippon Electric Glass Co., Ltd.)

The resulting pellets were evaluated as follows.

<Spreadability>
A product produced by dry-blending 40 mass % of pellets and 60 mass % of PP-B (including 20 mass % of GF) was formed into a flat sheet (140×140×2 mm) at a resin temperature of 230° C. and a die temperature of 40° C. The molded article was observed by applying light from a fluorescent lamp to the back side of the molded article, and the number of unspread fibers (undispersed GF aggregate) was counted. The average value of ten sheets was taken as the measured value.

<Colored Foreign Matter>
3 kg of pellets (number of pellets: about 92,000) were sampled and spread on white paper, and the number of pellets containing colored foreign matter was counted.

<Yellowness Index>
The yellowness index was measured in accordance with JIS K7105-1981.

<Measurement of Resin Pressure>

Figure 15:
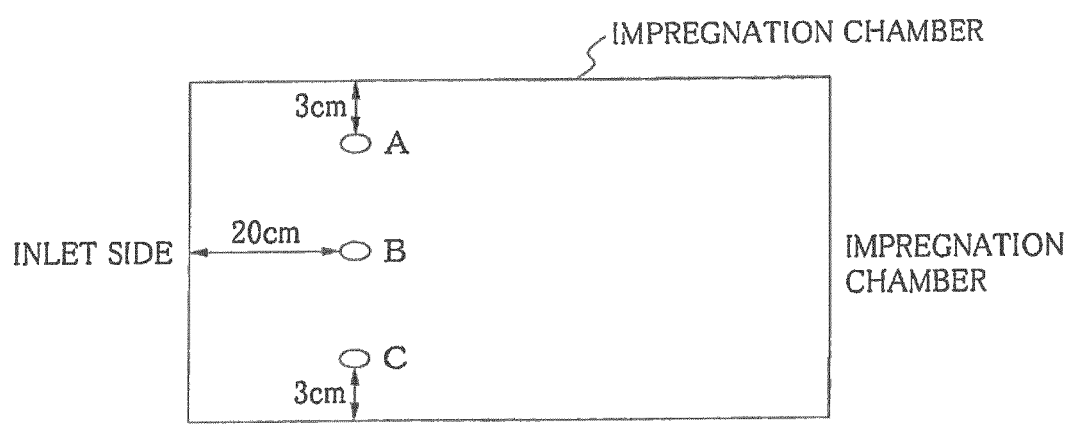
FIG. 15 is a view showing the resin pressure measurement positions in an impregnation chamber in the examples and comparative examples.

The resin pressure in the impregnation chamber in the examples and the comparative examples was measured As shown in FIG. 15, the resin pressure was measured in an impregnation chamber having a size shown in Table 1 by installing resin pressure sensors (manufactured by Kistler Japan Co. Ltd.) at a position (A) 20 cm from the inlet side and 3 cm from the left end of the impregnation chamber, a position (B) 20 cm from the inlet side at the center between the right and left sides, and a position (C) 20 cm from the inlet side and 3 cm from the right end.

<Measurement of Resin Flow Rate (Ratio)>

A threshold plate was provided in an impregnation chamber at the center between the right and left sides in a state in which fiber bundles were not loaded. A resin was supplied under the same conditions as the production conditions, and the amounts of resin leaked from the inlet and the outlet were taken as the resin inlet flows on the right and left.

Table 2 shows "(inlet flow on smaller inlet flow side)/(inlet flow on larger inlet flow side)" as the resin flow rate ratio.

Example 1

Figure 16:
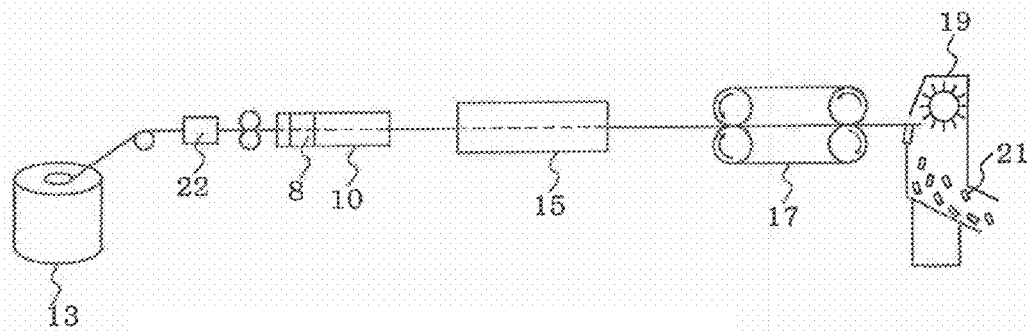
FIG. 16 is a view showing a long-fiber-reinforced resin pellet production device used in Example 1.

Long-fiber-reinforced pellets (long-fiber-reinforced resin composition) were produced using a device shown in FIG. 16.

Figure 12A:
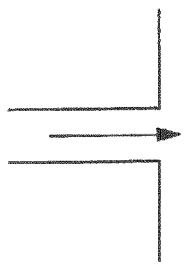
FIGS. 12(A)-12(D) are views showing examples of the shape of a resin flow inlet.
Figure 12B:
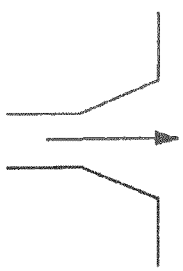
Figure 12C:
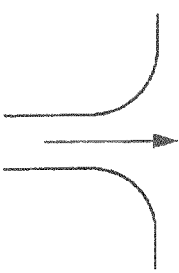
Figure 12D:
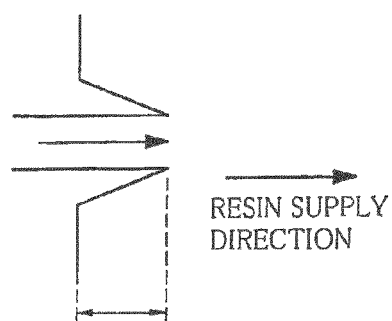

The resin flow inlet of the impregnation chamber had a shape shown in FIG. 12(A), the fiber bundle inlet had a shape shown in FIG. 13(A), and the fiber bundle outlet had a shape shown in FIG. 14(A).

A molten polypropylene-based resin (PP-A) and an acid-modified polypropylene-based resin (MAH-PP) were supplied to the impregnation chamber 10 from the extruder 8. Fiber bundles (GE) drawn from a glass roving 13 were preheated through a preheating bath 22, and introduced into the impregnation chamber 10 filled with PP-A and MAH-PP. The fiber bundles were impregnated with the resin components at a withdrawing rate of 20 m/min and a resin temperature of 280° C., and then formed into pellets using a cooling chamber 15, a withdrawer 17, and a cutting device (pelletizer) 19. The resulting pellets 21 had a length of 8 mm and a diameter of 2.0 mm and contained 47 mass % of PP-A, 3 mass % of MAH-PP, and 50 mass % of GF Tables 1 and 2 show the configuration of the impregnation chamber, the production conditions, and the evaluation results.

Examples 2 to 25 and Comparative Examples 1 to 5

Pellets were produced in the same manner as in Example 1 except for changing the configuration of the impregnation chamber and the production conditions as shown in Table 1 Table 2 shows the evaluation results.

TABLE 1

Figure 2E:
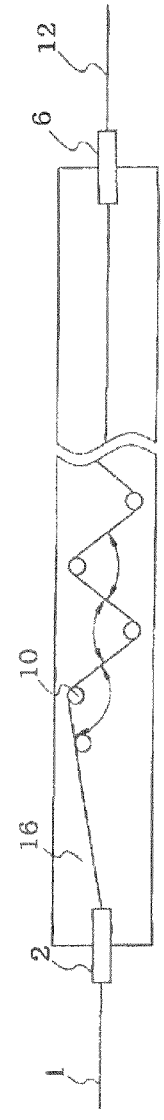

| | Impregnation chamber | | | | | | | | |
|---|---|---|---|---|---|---|---|---|---|
| | Number of fiber bundles n | Number of resin flow inlets m | Type | Number of spreading jigs | Dimensions | | | | |
| | | | | | H(cm) | W(cm) | L(cm) | l(cm) | Volume V (l) |
| Example 1 | 10 | 2 | FIG. 2(c) | 10 | 2 | 30 | 100 | 5 | 6 |
| Example 2 | 10 | 5 | FIG. 2(c) | 10 | 2 | 30 | 100 | 5 | 6 |
| Example 3 | 10 | 10 | FIG. 2(c) | 10 | 2 | 30 | 100 | 5 | 6 |
| Example 4 | 10 | 20 | FIG. 2(c) | 10 | 2 | 30 | 100 | 5 | 6 |
| Example 5 | 20 | 10 | FIG. 2(c) | 10 | 2 | 60 | 100 | 5 | 12 |
| Example 6 | 20 | 20 | FIG. 2(c) | 10 | 2 | 60 | 100 | 5 | 12 |
| Example 7 | 20 | 20 | FIG. 7(b) | 10 | 2 | 60 | 100 | 0 | 12 |
| Example 8 | 20 | 40 | FIG. 2(c) | 10 | 2 | 60 | 100 | 5 | 12 |
| Example 9 | 40 | 20 | FIG. 2(c) | 10 | 2 | 120 | 100 | 5 | 24 |
| Example 10 | 40 | 40 | FIG. 2(c) | 10 | 2 | 120 | 100 | 5 | 24 |
| Example 11 | 40 | 80 | FIG. 2(c) | 10 | 2 | 120 | 100 | 5 | 24 |
| Example 12 | 10 | 10 | FIG. 2(a) | 12 | 1 | 30 | 100 | 5 | 3 |
| Example 13 | 10 | 10 | FIG. 2(b) | 12 | 2 | 30 | 100 | 5 | 6 |
| Example 14 | 10 | 10 | FIG. 2(c) | 10 | 2 | 60 | 100 | 5 | 12 |
| Example 15 | 10 | 10 | FIG. 2(d) | 10 | 2 | 30 | 100 | 5 | 6 |
| Example 16 | 10 | 10 | FIG. 2(e) | 5 | 5 | 30 | 40 | 5 | 6 |
| Example 17 | 15 | 15 | FIG. 7(c) | 10 | 20 | 45 | 100 | 0 | 90 |
| Example 18 | 10 | 10 | FIG. 7(a) | 12 | 1 | 30 | 100 | 0 | 3 |
| Example 19 | 10 | 10 | FIG. 2(c) | 10 | 2 | 30 | 100 | 5 | 6 |
| Example 20 | 10 | 10 | FIG. 2(c) | 10 | 2 | 30 | 100 | 5 | 6 |
| Example 21 | 10 | 10 | FIG. 2(c) | 10 | 2 | 30 | 100 | 5 | 6 |
| Example 22 | 20 | 20 | FIG. 7(d) | 4 | 2 | 60 | 30 | 0 | 3.6 |
| Example 23 | 10 | 5 | FIG. 2(c) | 10 | 2 | 30 | 100 | 5 | 6 |
| Example 24 | 10 | 5 | FIG. 2(c) | 10 | 2 | 30 | 100 | 5 | 6 |
| Example 25 | 4 | 1 | FIG. 7(b) | 10 | 2 | 24 | 100 | 0 | 4.8 |
| Comparative Example 1 | 10 | 1 | FIG. 2(c) | 10 | 2 | 30 | 100 | 65 | 6 |
| Comparative Example 2 | 10 | 1 | FIG. 2(c) | 10 | 2 | 30 | 100 | 5 | 6 |
| Comparative Example 3 | 20 | 1 | FIG. 2(c) | 10 | 2 | 60 | 100 | 5 | 12 |
| Comparative Example 4 | 40 | 1 | FIG. 2(c) | 10 | 2 | 120 | 100 | 5 | 24 |
| Comparative Example 5 | 60 | 1 | FIG. 2(c) | 10 | 2 | 180 | 100 | 5 | 36 |

TABLE 1-continued

| | Impregnation chamber | | | Molten resin residence time (min) V/w | Resin inlet floe (amount discharged from extruder) W (l/hr) | With-drawing rate (m/min) | PP |
|---|---|---|---|---|---|---|---|
| | Resin flow inlet | Position of resin flow inlet l/L | Inflow angle θ' (°) | Resin temp. (° C.) | | | |
| Example 1 | FIG. 1 | 0.05 | 90 | 280 | 12 | 30 | 20 | PP-A |
| Example 2 | FIG. 5 | 0.05 | 90 | 280 | 12 | 30 | 20 | PP-A |
| Example 3 | FIG. 5 | 0.05 | 90 | 280 | 12 | 30 | 20 | PP-A |
| Example 4 | FIG. 5 | 0.05 | 90 | 280 | 12 | 30 | 20 | PP-A |
| Example 5 | FIG. 5 | 0.05 | 90 | 280 | 12 | 60 | 20 | PP-A |
| Example 6 | FIG. 5 | 0.05 | 90 | 280 | 12 | 60 | 20 | PP-A |
| Example 7 | FIG. 6 | 0.00 | 0 | 280 | 12 | 60 | 20 | PP-A |
| Example 8 | FIG. 5 | 0.05 | 90 | 280 | 12 | 60 | 20 | PP-A |
| Example 9 | FIG. 5 | 0.05 | 90 | 280 | 12 | 120 | 20 | PP-A |
| Example 10 | FIG. 5 | 0.05 | 90 | 280 | 12 | 120 | 20 | PP-A |
| Example 11 | FIG. 5 | 0.05 | 90 | 280 | 12 | 120 | 20 | PP-A |
| Example 12 | FIG. 5 | 0.05 | 90 | 280 | 6 | 30 | 20 | PP-A |
| Example 13 | FIG. 5 | 0.05 | 90 | 280 | 6 | 60 | 40 | PP-A |
| Example 14 | FIG. 5 | 0.05 | 90 | 280 | 24 | 30 | 20 | PP-A |
| Example 15 | FIG. 5 | 0.05 | 90 | 280 | 12 | 30 | 20 | PP-A |
| Example 16 | FIG. 5 | 0.13 | 90 | 280 | 12 | 30 | 20 | PP-A |
| Example 17 | FIG. 6 | 0.00 | 0 | 280 | 120 | 45 | 20 | PP-A |
| Example 18 | FIG. 6 | 0.00 | 0 | 280 | 6 | 30 | 20 | PP-A |
| Example 19 | FIG. 5 | 0.05 | 90 | 280 | 12 | 30 | 20 | PP-B |
| Example 20 | FIG. 5 | 0.05 | 90 | 280 | 12 | 30 | 20 | PP-C |
| Example 21 | FIG. 5 | 0.05 | 90 | 280 | 12 | 30 | 20 | PP-D |
| Example 22 | FIG. 6 | 0.00 | 0 | 280 | 3.6 | 60 | 20 | PP-A |
| Example 23 | FIG. 5 | 0.05 | 90 | 240 | 12 | 30 | 20 | PP-A |
| Example 24 | FIG. 5 | 0.05 | 90 | 310 | 12 | 30 | 20 | PP-A |
| Example 25 | FIG. 8 | 0.00 | 0 | 280 | 24 | 12 | 20 | PP-A |
| Comparative Example 1 | FIG. 9 | 0.65 | 90 | 280 | 12 | 30 | 20 | PP-A |
| Comparative Example 2 | FIG. 10 | 0.05 | 90 | 280 | 12 | 30 | 20 | PP-A |
| Comparative Example 3 | FIG. 10 | 0.05 | 90 | 280 | 12 | 60 | 20 | PP-A |
| Comparative Example 4 | FIG. 10 | 0.05 | 90 | 280 | 12 | 120 | 20 | PP-A |
| Comparative Example 5 | FIG. 10 | 0.05 | 90 | 280 | 12 | 180 | 20 | PP-A |

TABLE 2

| | Evaluation | | | | | | | |
|---|---|---|---|---|---|---|---|---|
| | Spreadability (number/sheet) | Colored foreign matter (number/3 kg) | Yellowness index (YI) | Resin pressure (kgf/cm²) | | | Change rate (%) | Resin flow rate ratio |
| | | | | A | B | C | | |
| Example 1 | 21 | 38 | 17 | 7 | 5 | 7 | 28 | 0.76 |
| Example 2 | 8 | 3 | 12 | 5 | 5 | 5 | 0 | 0.88 |
| Example 3 | 3 | 1 | 12 | 5 | 5 | 5 | 0 | 1.00 |
| Example 4 | 2 | 1 | 12 | 5 | 5 | 5 | 0 | 1.00 |
| Example 5 | 8 | 3 | 12 | 5 | 5 | 5 | 0 | 0.94 |
| Example 6 | 3 | 1 | 12 | 5 | 5 | 5 | 0 | 1.00 |
| Example 7 | 3 | 0 | 12 | 5 | 5 | 5 | 0 | 1.00 |
| Example 8 | 2 | 1 | 12 | 5 | 5 | 5 | 0 | 1.00 |
| Example 9 | 8 | 3 | 12 | 5 | 5 | 5 | 0 | 0.94 |
| Example 10 | 3 | 1 | 12 | 5 | 5 | 5 | 0 | 0.97 |
| Example 11 | 2 | 1 | 12 | 5 | 5 | 5 | 0 | 1.00 |
| Example 12 | 0 | 6 | 7 | 5 | 5 | 5 | 0 | 1.00 |
| Example 13 | 17 | 0 | 7 | 5 | 5 | 5 | 0 | 1.00 |
| Example 14 | 3 | 10 | 16 | 5 | 5 | 5 | 0 | 1.00 |
| Example 15 | 0 | 0 | 10 | 5 | 5 | 5 | 0 | 1.00 |
| Example 16 | 11 | 7 | 12 | 5 | 5 | 5 | 0 | 1.00 |
| Example 17 | 8 | 14 | 19 | 5 | 5 | 5 | 0 | 0.96 |
| Example 18 | 0 | 6 | 7 | 5 | 5 | 5 | 0 | 1.00 |
| Example 19 | 15 | 1 | 11 | 5 | 5 | 5 | 0 | 1.00 |
| Example 20 | 1 | 1 | 13 | 5 | 5 | 5 | 0 | 1.00 |
| Example 21 | 0 | 6 | 17 | 5 | 5 | 5 | 0 | 1.00 |
| Example 22 | 18 | 0 | 7 | 5 | 5 | 5 | 0 | 1.00 |

TABLE 2-continued

|  | Evaluation | | | | | | | |
|---|---|---|---|---|---|---|---|---|
|  |  | Colored foreign |  | Resin pressure (kgf/cm$^2$) | | | | |
|  | Spreadability (number/ sheet) | matter (number/ 3 kg) | Yellowness index (YI) | A | B | C | Change rate (%) | Resin flow rate ratio |
| Example 23 | 13 | 5 | 11 | 5 | 5 | 5 | 0 | 1.00 |
| Example 24 | 4 | 10 | 13 | 5 | 5 | 5 | 0 | 1.00 |
| Example 25 | 1 | 24 | 17 | 5 | 6 | 5 | 17 | 0.85 |
| Comparative Example 1 | 90 | 300 | 21 | 5 | 7 | 10 | 50 | 0.00 |
| Comparative Example 2 | 48 | 100 | 21 | 5 | 6 | 9 | 44 | 0.00 |
| Comparative Example 3 | 59 | 120 | 23 | 5 | 6 | 10 | 50 | 0.00 |
| Comparative Example 4 | 70 | 150 | 25 | 5 | 7 | 11 | 55 | 0.00 |
| Comparative Example 5 | 80 | 180 | 26 | 5 | 8 | 13 | 61 | 0.00 |

INDUSTRIAL APPLICABILITY

A molded article of the fiber-reinforced resin composition produced by the production method according to the present invention is suitable for automobile parts (front end, fan shroud, cooling fan, engine undercover, engine cover, radiator box, side door, back door inner, back door outer, outer panel, roof rail, door handle, luggage box, wheel cover, handle, cooling module, air cleaner parts, air cleaner casing, pedal, sun shade, armrest, torque control bracket, fender, and step), motorcycle/bicycle parts (luggage box, handle, and wheel), household appliances (warm water cleansing toilet seat, bathroom supply, chair leg, valves, meter box, hair catchers and counter stay), consumer electronic parts balancing ring, spin-dryer pan covers spin-dryer pan, exhaust port guide, washing machine parts, washing and drying machine parts, and drying machine parts), others (electric tool parts, lawn mower handle, hose joint, resin bolt, concrete frame, and various trays such as a meal tray), and the like. In particular, the molded article is optimum for automobile parts such as a luggage box, side door, air cleaner case, backdoor inner, and front end module (including fan shroud, fan, and cooling module) meter box, switchboard, and engine cover.

The invention claimed is:

1. A method for producing a fiber-reinforced resin composition comprising:
   supplying a plurality of fiber bundles into an enclosed space having a box-shape within an impregnation chamber, in which enclosed space having a box-shape threshold plates are provided, some of the plurality of fiber bundles passing between the threshold plates along at least part of longitudinal sides of the impregnation chamber;
   supplying a molten thermoplastic resin from a plurality of resin flow inlets into the enclosed space, the plurality of resin flow inlets being almost symmetrically positioned relative to the direction of progress of the fiber bundles on opposing faces of the impregnation chamber, so that the pressure of resin flow from the resin flow inlets of one opposed face is almost the same as the pressure of resin flow from the resin flow inlets of the other opposed face;
   contacting the molten thermoplastic resin with the fiber bundles in the impregnation chamber to impregnate the fiber bundles with the molten thermoplastic resin; and
   withdrawing the fiber bundles impregnated with the molten thermoplastic resin from the impregnation chamber.

2. The method according to claim 1 wherein the plurality of resin flow inlets are provided near the fiber-bundle supplying side in the impregnation chamber.

3. The method according to claim 1 wherein 2 to 10,000 resin flow inlets are provided.

4. The method according to claim 1 wherein the thermoplastic resin is polypropylene-based resin having a melt flow rate (MFR) of 1 to 800 g/10 min; and
   fibers forming the fiber bundles are glass fibers having an average diameter of 3 to 30 µM.

5. The method according to claim 1 wherein almost the same resin pressure means that the change rate, (maximum pressure−minimum pressure)/maximum pressure×100%, is 30% or less.

6. The method according to claim 5 wherein almost the same resin pressure means that the change rate, (maximum pressure−minimum pressure)/maximum pressure×100%, is 15% or less.

7. A method for producing a fiber-reinforced resin composition comprising:
   supplying a plurality of fiber bundles into an impregnation chamber having an enclosed box-shaped space and threshold plates provided within the enclosed box-shaped space, some of the fiber bundles passing between threshold plates along at least part of longitudinal sides of the impregnation chamber;
   wherein the impregnation chamber has two opposed faces, each face has at least one resin flow inlet, and the resin flow inlet(s) on each opposed face are positioned almost symmetrically with respect to the resin flow inlet(s) on the other opposed face;
   supplying a molten thermoplastic resin from the resin flow inlets into the enclosed space so that the amount of resin flow from the resin flow inlet(s) of one opposed face is almost the same as the amount of resin flow from the resin flow inlet(s) of the other opposed face;
   contacting the molten thermoplastic resin with the fiber bundles to impregnate the fiber bundles with the molten thermoplastic resin; and
   withdrawing the fiber bundles impregnated with the molten thermoplastic resin from the impregnation chamber.

8. The method according to claim 7, wherein:
the molten thermoplastic resin is supplied from the plurality of resin flow inlets through a branched flow path into the impregnation chamber.

9. The method according to claim 7 wherein the plurality of resin flow inlets is provided near the fiber-bundle supplying side in the impregnation chamber.

10. The method according to claim 7 wherein 2 to 10,000 resin flow inlets are provided.

11. The method according to claim 7 wherein the thermoplastic resin is polypropylene-based resin having a melt flow rate (MFR) of 1 to 800 g/10 min; and fibers forming the fiber bundles are glass fibers having an average diameter of 3 to 30 μm.

12. The method according to claim 7 wherein almost the same amount means that the resin inlet flow ratio, (inlet flow on small inlet flow side)/(inlet flow on large inlet flow side), is 0.7 to 1.

13. The method according to claim 12 wherein almost the same amount means that the resin inlet flow ratio, (inlet flow on small inlet flow side)/(inlet flow on large inlet flow side), is 0.8 to 1.

\* \* \* \* \*